(12) United States Patent
Chang et al.

(10) Patent No.: US 8,531,527 B2
(45) Date of Patent: Sep. 10, 2013

(54) ACOUSTIC-WAVE SENSOR, ACOUSTIC-WAVE SENSOR ARRAY, AND ULTRASONIC IMAGING APPARATUS

(75) Inventors: Chienliu Chang, Kawasaki (JP); Kenichi Nagae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/595,035

(22) PCT Filed: Aug. 25, 2008

(86) PCT No.: PCT/JP2008/065621
§ 371 (c)(1), (2), (4) Date: Oct. 7, 2009

(87) PCT Pub. No.: WO2009/028701
PCT Pub. Date: Mar. 5, 2009

(65) Prior Publication Data
US 2011/0187868 A1 Aug. 4, 2011

(30) Foreign Application Priority Data

Aug. 27, 2007 (JP) .................................. 2007-219925

(51) Int. Cl.
| | | |
|---|---|---|
| *G01S 15/89* | (2006.01) | |
| *G01H 1/00* | (2006.01) | |
| *G01H 9/00* | (2006.01) | |
| *G01P 1/07* | (2006.01) | |
| *G01D 5/32* | (2006.01) | |
| *G01N 9/18* | (2006.01) | |
| *G01N 21/41* | (2006.01) | |
| *G01N 29/04* | (2006.01) | |
| *G01B 9/02* | (2006.01) | |

(52) U.S. Cl.
USPC ................ 348/163; 73/653; 73/655; 73/657; 385/13; 359/577; 359/578

(58) Field of Classification Search
None
See application file for complete search history.

(56) References Cited

U.S. PATENT DOCUMENTS 4,446,543 A * 5/1984 McLandrich et al. ........ 367/149
4,732,599 A    3/1988 Bennion ..................... 65/30.13
(Continued)

FOREIGN PATENT DOCUMENTS

FR   2443698   7/1980
JP   10-048039  2/1998

OTHER PUBLICATIONS

International Search Report and Written Opinion from corresponding PCT Application No. PCT/JP2008/065621, dated Dec. 11, 2009.

(Continued)

*Primary Examiner* — Joseph Ustaris
*Assistant Examiner* — Edemio Navas, Jr.
(74) *Attorney, Agent, or Firm* — Fitzpatrick, Cella, Harper & Scinto

(57) ABSTRACT

An acoustic-wave sensor (10) is constructed by a membrane (11) adapted to be displaced by an acoustic wave, a first waveguide (16a) for transmitting light therein, an optical coupling part (15) to which the light transmitted through the first waveguide (16a) is adapted to be optically coupled, and a second waveguide (16b) through which the light coupled from the optical coupling part (15) transmits. When the membrane (11) is displaced by its reception of the acoustic wave, at least one of an optical coupling coefficient between the first waveguide (16a) and the optical resonator (15) and an optical coupling coefficient between the second waveguide (16b) and the optical resonator (15) is changed to output a corresponding optical signal.

24 Claims, 13 Drawing Sheets

(56) References Cited

U.S. PATENT DOCUMENTS

| | | | |
|---|---|---|---|
| 5,886,265 A * | 3/1999 | Chatrefou | 73/651 |
| 2002/0149850 A1* | 10/2002 | Heffner et al. | 359/578 |
| 2006/0013529 A1* | 1/2006 | Sugawara et al. | 385/27 |
| 2008/0095490 A1* | 4/2008 | Ashkenazi et al. | 385/13 |

OTHER PUBLICATIONS

Yariv A., "Universal Relations for Coupling of Optical Power between Microresonators and Dielectric Waveguides" Electronic Letters, vol. 36, No. 4, 2000, pp. 321-322.

* cited by examiner

INCIDENT LIGHT (LIGHT SOURCE) 16a  DETECTION LIGHT (DETECTOR) 16b

ULTRASONIC WAVE

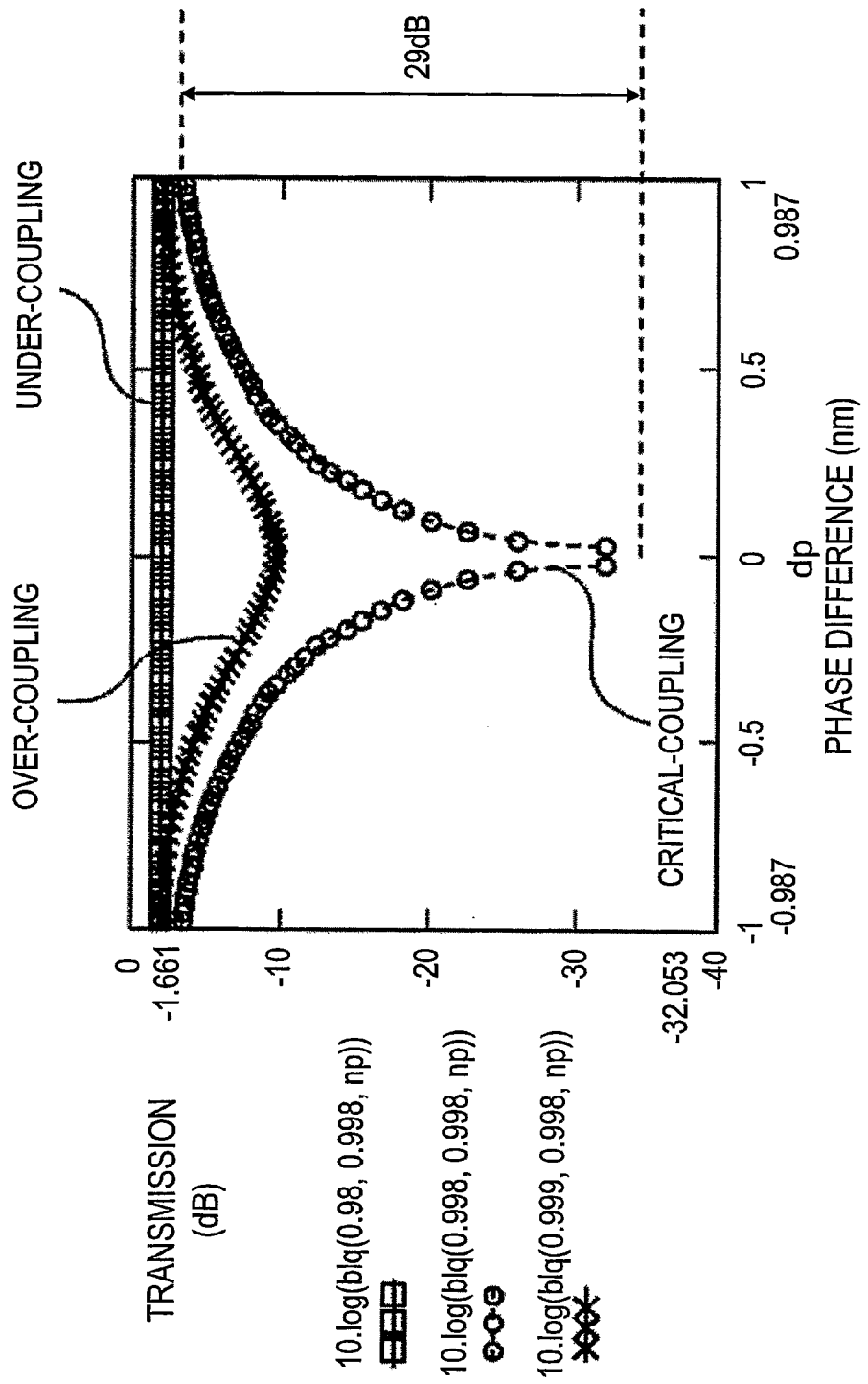

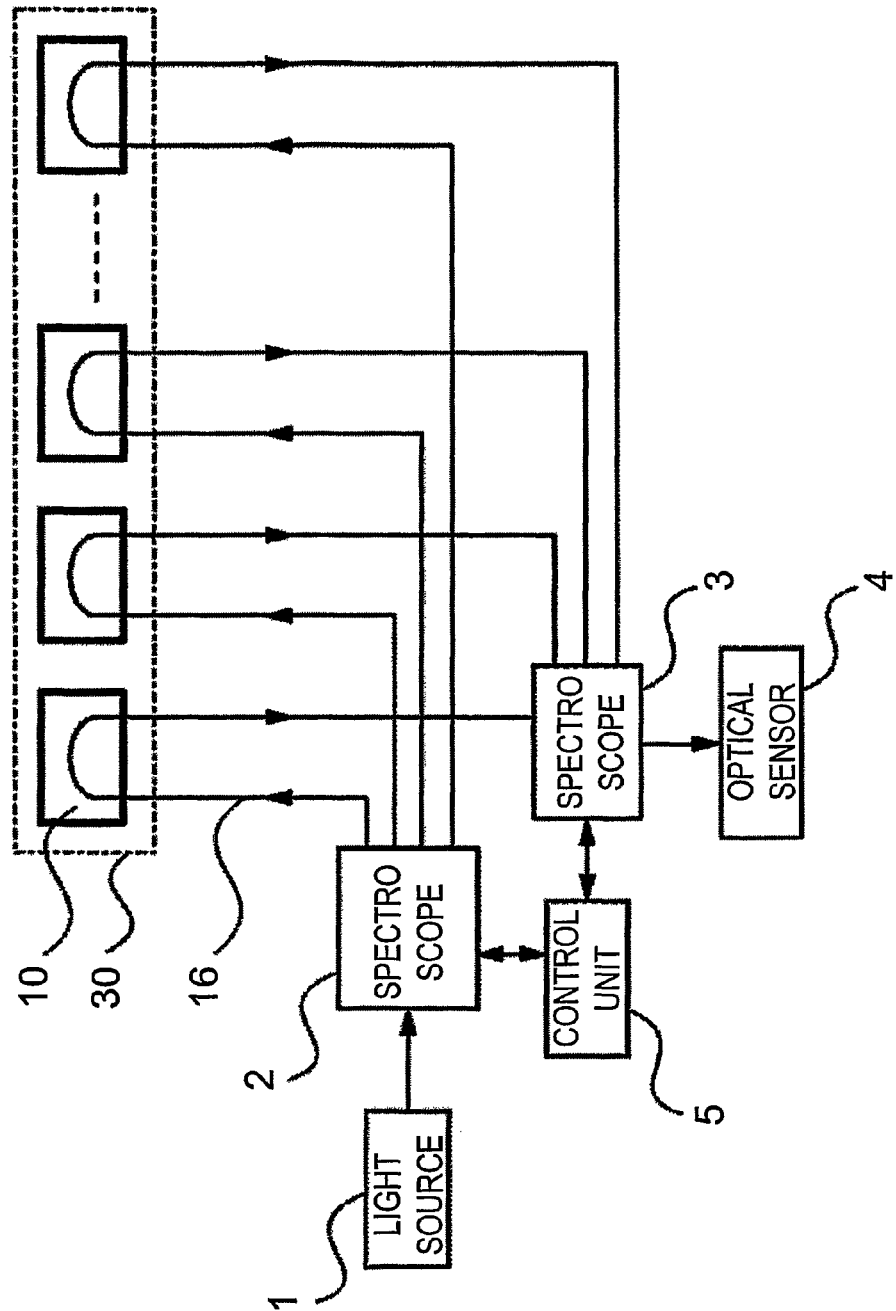

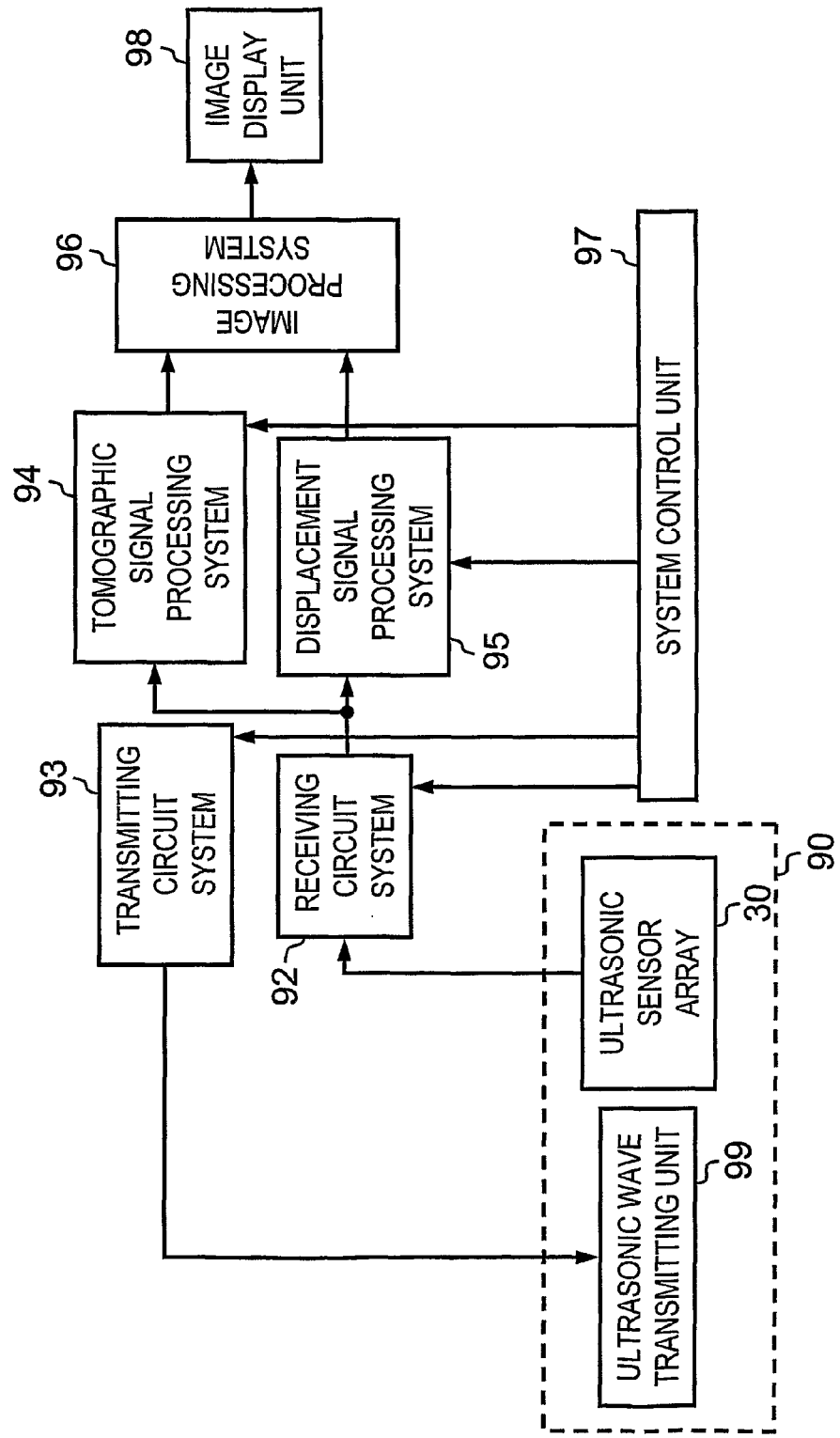

ACOUSTIC-WAVE SENSOR, ACOUSTIC-WAVE SENSOR ARRAY, AND ULTRASONIC IMAGING APPARATUS

TECHNICAL FIELD

The present invention relates to an acoustic-wave sensor that detects a sound wave by the use of an optical means. The acoustic-wave sensor of the present invention is particularly suitable for detecting an ultrasonic wave.

BACKGROUND ART

In the past, it has been general that ultrasonic diagnostic apparatuses use an ultrasonic sensor with a piezoelectric element. However, with ultrasonic sensors using a piezoelectric element, there is a problem that it is difficult to produce two-dimensional (2D) sensors.

In order to obtain a three-dimensional (3D) image of good image quality in an ultrasonic diagnostic apparatus, it is desirable to use a 2D sensor that is able to acquire a 2D image without scanning a sensor array. Accordingly, there have been developed ultrasonic sensors of various structures based on various detection principles, other than those which use piezoelectric elements.

Among such sensors, the following one has been known as an ultrasonic sensor for detecting an ultrasonic wave by using an optical means (see Japanese patent application laid-open No. H10 (1998)-048039).

Japanese patent application laid-open No. H10 (1998)-048039 describes an ultrasonic sensor in which a refractive index in the interior of a ring resonator is changed due to the pressure of an ultrasonic wave received by the ring resonator. Specifically, when the refractive index in the interior of the ring resonator is changed, the resonance frequency of the ring resonator is changed, too, so the ultrasonic wave is intended to be detected by making use of the change in the resonance frequency.

As an imaging apparatus using an ultrasonic detecting device as stated above, there have been required ultrasonic sensors based on a variety of schemes from the viewpoint of further improvements in detection accuracy, the degree of freedom in design, and so on.

DISCLOSURE OF INVENTION

In view of the above, the present invention has for its object to provide acoustic-wave sensors which use an optical detection scheme and which are based on a quite new and novel detection principle.

An acoustic-wave sensor (ultrasound sensor or ultrasonic sensor) according to one aspect of the present invention is provided with an acoustic wave receiving part that is constructed to include a movable part adapted to be displaced by an acoustic wave, a waveguide for transmitting light therein, and an optical coupling part to which the light transmitted through the waveguide is adapted to be optically coupled, wherein an optical signal is output which corresponds to an optical coupling coefficient between the waveguide and the optical coupling part, the optical coupling coefficient being changed in accordance with a displacement of the acoustic wave receiving part generated by its reception of the acoustic wave.

An acoustic-wave sensor (ultrasound sensor or ultrasonic sensor) according to another aspect of the present invention is provided with an acoustic wave receiving part that is constructed to include a movable part adapted to be displaced by an acoustic wave, a first waveguide for transmitting light therein, an optical coupling part to which the light transmitted through the first waveguide is adapted to be optically coupled, and a second waveguide in which the light coupled from the optical coupling part transmits, wherein an optical signal is output which corresponds to at least one of a first optical coupling coefficient between the first waveguide and the optical coupling part and a second optical coupling coefficient between the second waveguide and the optical coupling part, the first and second optical coupling coefficients being changed in accordance with a displacement of the acoustic wave receiving part generated by its reception of the acoustic wave.

An acoustic-wave sensor (ultrasound sensor or ultrasonic sensor) according to a further aspect of the present invention is provided with an acoustic wave receiving part that is constructed to include a movable part adapted to be displaced by an acoustic wave, a first waveguide for transmitting light therein, and a second waveguide in which the light coupled from the first waveguide transmits, wherein an optical signal is output which corresponds to an optical coupling coefficient between the first waveguide and the second waveguide, the optical coupling coefficient being changed in accordance with a displacement of the acoustic wave receiving part generated by its reception of the acoustic wave.

An acoustic-wave sensor (ultrasound sensor or ultrasonic sensor) according to a still further aspect of the present invention is provided with an acoustic wave receiving part that is constructed to include a movable part adapted to be displaced by an acoustic wave, a first waveguide for transmitting light therein, a first optical resonator to which the light transmitted through the first waveguide is adapted to be optically coupled, and a second optical resonator connected with the acoustic wave receiving part, wherein an optical signal is output which corresponds to a relative distance between the first optical resonator and the second optical resonator, the relative distance being changed in accordance with a displacement of the acoustic wave receiving part generated by its reception of the acoustic wave.

According to the above-mentioned various aspects of the present invention, there are provided new and novel acoustic sensors and new and novel ultrasonic detection methods by making use of a change in optical coupling.

Other features and advantages of the present invention will be apparent from the following description taken in conjunction with the accompanying drawings, in which like reference numerals and characters designate the same or similar parts throughout the figures thereof.

BRIEF DESCRIPTION OF DRAWINGS

FIG. 2 is a view showing the phase difference dependency of a optical transmission power ratio of a waveguide.

FIG. 8 is a schematic diagram showing one example of an ultrasonic sensor array making use of ultrasonic sensors of the present invention.

FIG. 9 is a block diagram of an ultrasonic imaging apparatus making use of ultrasonic sensors of the present invention.

DESCRIPTION OF EMBODIMENTS

Figure 1A:
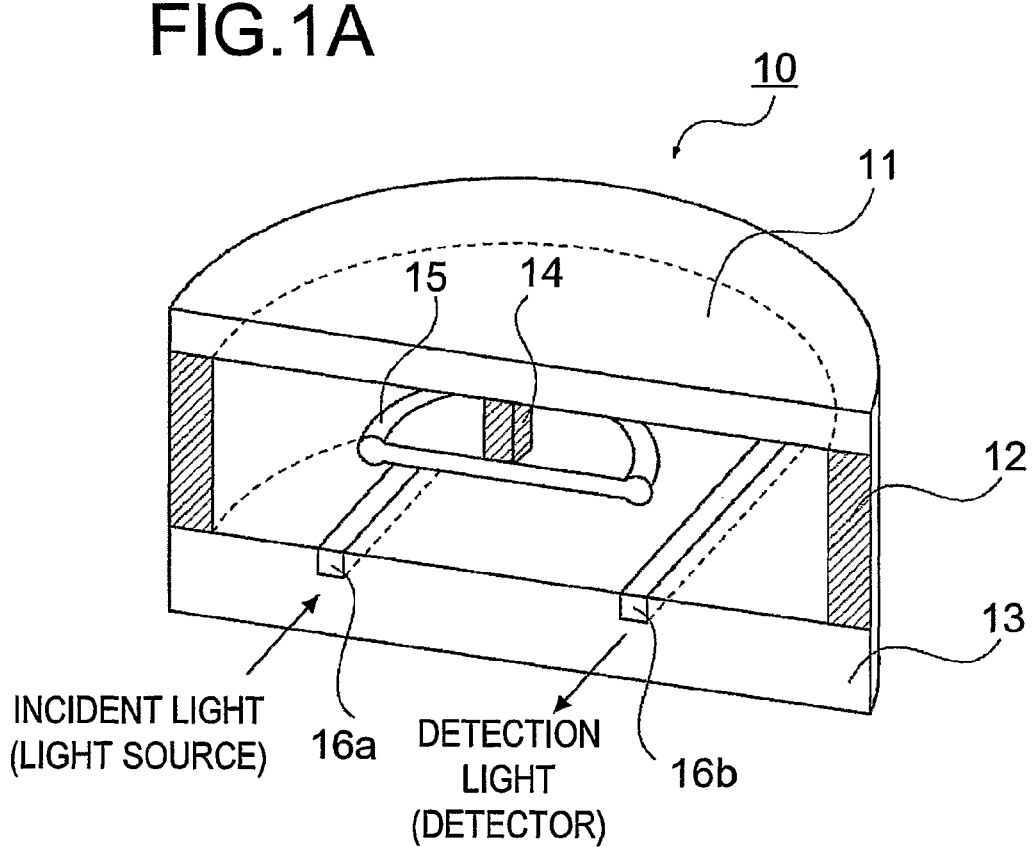
FIG. 1A is a perspective view of an ultrasonic sensor according to a first embodiment of the present invention when it is cut into halves.

Now, preferred embodiments of the present invention will be described in detail in accordance with the accompanying drawings.

Hereinafter, the present invention will be explained in more detail while referring to the accompanying drawings. Here, note that the same or like reference numerals are attached, as a rule, to the same component elements or parts while omitting an explanation thereof.

What is common in respective embodiments of an acoustic-wave sensor (ultrasound sensor or ultrasonic sensor) of the present invention is that an acoustic wave receiving part, which is constructed to include a movable part adapted to be displaced by an acoustic wave, acts to receive sound or acoustic wave. As a movable part which is displaced by an acoustic wave, there is enumerated a membrane (vibration membrane) that is supported by an acoustic-wave sensor. In addition, the movable part may be a vibration plate which can not necessarily be caused to vibrate itself, like a membrane, upon reception of a sound or acoustic wave, but which can be formed of a material of high rigidity even if the vibration plate is constructed such that it is supported by the acoustic-wave sensor so as to be movable by the reception of the sound wave. One example of such a vibration plate is a cantilever. In case where the movable part is composed of a membrane, the membrane is caused to vibrate due to the pressure of the sound wave. The present invention is characterized in that the displacement of this membrane is detected as a change in an optical signal (e.g., a change in optical strength or a change in phase).

The term "sound or acoustic wave" in this specification is not limited to an elastic wave transmitting in air, but is a generic name for all kinds of elastic waves that transmit through elastic bodies irrespective of their states, i.e., gas, liquid or solid. In other words, it is a broad concept even including an ultrasonic wave that is an elastic wave of frequencies exceeding human audio frequencies.

Accordingly, the acoustic-wave sensor of the present invention can be applied, as an ultrasonic probe, to an ultrasonic diagnostic apparatus (echographer) or the like. Hereinafter, the present invention will be described as applied to an ultrasonic sensor for detecting an ultrasonic wave, but it will be clear that acoustic waves which can be detected according to the present invention are not limited to ultrasonic waves, in view of the detection principle of the acoustic-wave sensor of the present invention.

First Embodiment

Figure 1B:
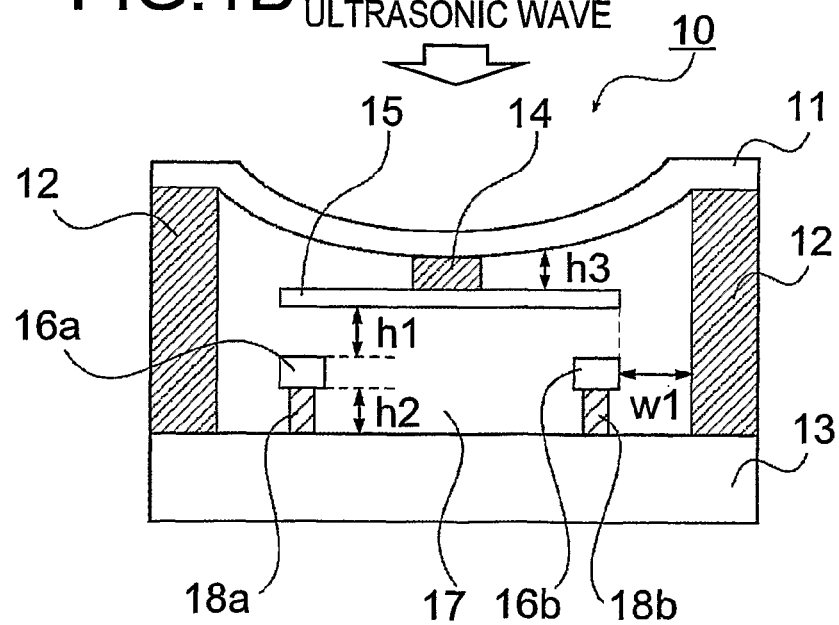
FIG. 1B is a cross sectional view of a modified form of ultrasonic sensor which is similar in construction to that in FIG. 1A.

First of all, the construction and the detection principle of an ultrasonic sensor according to the present invention will be described based on one embodiment thereof. FIG. 1A is a perspective view of an ultrasonic sensor according to a first embodiment of the present invention when it is cut into halves, and FIG. 1B is a cross sectional view of a modified form of ultrasonic sensor which is similar in construction to that in FIG. 1A.

A vibration membrane support member 12 is formed on a substrate or base plate 13 as the basic structure of an ultrasonic sensor 10, and the vibration membrane support member 12 serves to support an ultrasonic wave receiving part in the form of a membrane 11. A space with a cavity 17 defined therein is formed by the base plate 13, the vibration membrane support member 12 and the membrane 11. In the cavity 17, there are arranged a first waveguide 16a for transmitting incident light from a light source, an optical resonator 15 that serves as an optical coupling part in which the light transmitted through the first waveguide 16a can be coupled, and a second waveguide 16b in which the coupled light may transmit from the optical resonator 15. The optical resonator 15 is fixedly supported by an optical resonator support member 14 at a location under the vibration membrane 11. In addition, although the first and second waveguides 16a, 16b are constructed as embedded in the base plate 13 in FIG. 1A, they can instead be supported by waveguide support members 18a, 18b, respectively, as shown in FIG. 1B.

When the membrane 11 receives an ultrasonic wave, the membrane 11 is caused to vibrate by the pressure of the ultrasonic wave. In this embodiment, a relative distance (h1) between the optical resonator 15 and the first waveguide 16a and a relative distance between the optical resonator 15 and the second waveguide 16b are changed in accordance with the displacement of the membrane 11. As a result, an optical coupling coefficient between the first waveguide 16a and the optical resonator 15 and an optical coupling coefficient between the second waveguide 16b and the optical resonator 15 are accordingly changed. The changes in these optical coupling coefficients affect the amount or wavelength of the light detected by a detector, so it is possible to detect the ultrasonic wave in an indirect manner by detecting the change in the amount or wavelength of the light.

That is, the ultrasonic sensor 10 outputs an optical signal corresponding to at least one of the optical coupling coefficient between the first waveguide 16a and the optical resonator 15 and the optical coupling coefficient between the second waveguide 16b and the optical resonator 15, which are caused to change due to reception of the ultrasonic wave.

(Description of the Detection Principle)

The meaning of the change of the optical coupling coefficient caused by the changes in the relative distances as stated above will be described. In the ultrasonic sensor of FIG. 1A or 1B, let us assume the relative distance of the first waveguide 16a and the optical resonator 15 to be h1. In general, among light transmitting through a waveguide, part of the light having an inherent resonant wavelength that depends on an optical resonator arranged in opposition to the waveguide or part of the light having a wavelength in the vicinity of the inherent resonant wavelength generates optical coupling with the optical resonator so that it moves into the optical resonator.

The ratio of the part of light causing light coupling with respect to the other part thereof changes in accordance with a relative distance between the waveguide and the optical resonator, and there exists a specific relative distance at which the rate of the optical coupling becomes the highest. Here, a state in which the rate of the optical coupling is the highest is called a "critical coupling" state. When the relative distance between the waveguide and the optical resonator becomes less than the specific relative distance corresponding to the critical coupling state, i.e., when the waveguide and the optical resonator become nearer to each other, the optical coupling becomes an "over coupling" state, whereas when the relative distance becomes larger than the specific relative distance, i.e., when the waveguide and the optical resonator become farther away from each other, the optical coupling becomes an "under coupling" state.

The "optical coupling coefficient" in this specification means the ratio of light causing light coupling among all the incident light, and an optical definition thereof is as follows.

optical coupling coefficient $K$=amplitude of transmitted light/amplitude of incident light in an adjacent waveguide Here, the amplitude of light is in direct proportion to the square root of the power of light (optical power), so the following expression holds, too.

$K^2$=power of transmitted light/power of incident light in adjacent waveguide=transmission power ratio of optical coupling The ratio of part of light being coupled to the optical resonator among the light having entered the sensor 10 from the light source through the first waveguide 16a changes in accordance with the change of the distance h1. Hereinafter, this operation will be described.

A graph to describe the detection of a displacement by the membrane (vibration membrane) of the present invention is shown below. FIG. 2 is a view that shows the phase difference dependency of an optical transmission power ratio of a waveguide, wherein the axis of ordinate represents the optical transmission power ratio (unit: dB) and the axis of abscissa represents the phase difference (unit: nm). The optical transmission power ratio of the waveguide is a parameter representing, among light incident to the waveguide, an amount of the light that transmits through the waveguide as it is without being optically coupled to an optical resonator. In addition, the phase difference mentioned here means a difference between a resonant wavelength inherent to the optical resonator and the wavelength of light that transmits through the optical waveguide and enters an ultrasonic sensor.

In preparing FIG. 2, a simulation was conducted by using expressions, as set forth in "Universal relations for coupling of optical power between microresonators and dielectric waveguides", by A. Yariv, Electronics Letters, 17th February, 2000, Vol. 36, No. 4. The disclosure of this article is incorporated herein by reference. The condition for the simulation is shown below.

center frequency(resonant wavelength)=1550nm, coupling loss=0.998, under coupling(internal loss=0.98), critical coupling(internal loss=0.998), and over coupling(Internal loss=0.999).

The coupling loss is a loss of light emanated or diverged to a surrounding free space when an optical coupling is made between a waveguide and a resonator. The internal loss is a loss of light transmitted to the interior of a medium in the resonator or the waveguide.

The coupling between the waveguide and the optical resonator has three states, an "under coupling", a "critical coupling" and an "over coupling", depending on the magnitude of internal loss of the optical resonator. In the state of the under coupling, there is substantially no change in the optical transmission power ratio due to the phase difference. On the other hand, in the state of the over coupling, the optical transmission power ratio is changed by a maximum of about −10 dB with respect to a change in the phase difference. In the state of the critical coupling, the change in the optical transmission power ratio due to the phase difference is the most sensitive, so an amount of change of a maximum of about 29 dB in the optical transmission power ratio is generated due to a phase difference of 1 nm. According to the present invention, the displacement of the vibration membrane is detected by using the high sensitive characteristic of the transmission power ratio vs. phase difference in the critical coupling state.

For example, an initial interval or distance h1$o$ between the optical resonator 15 and the first waveguide 16a is set such that they are in the position of the critical coupling, whereby the displacement of the vibration membrane can be detected by a change ($\Delta$h1=h1−h1$o$) in the interval or distance h1.

Figure 3:
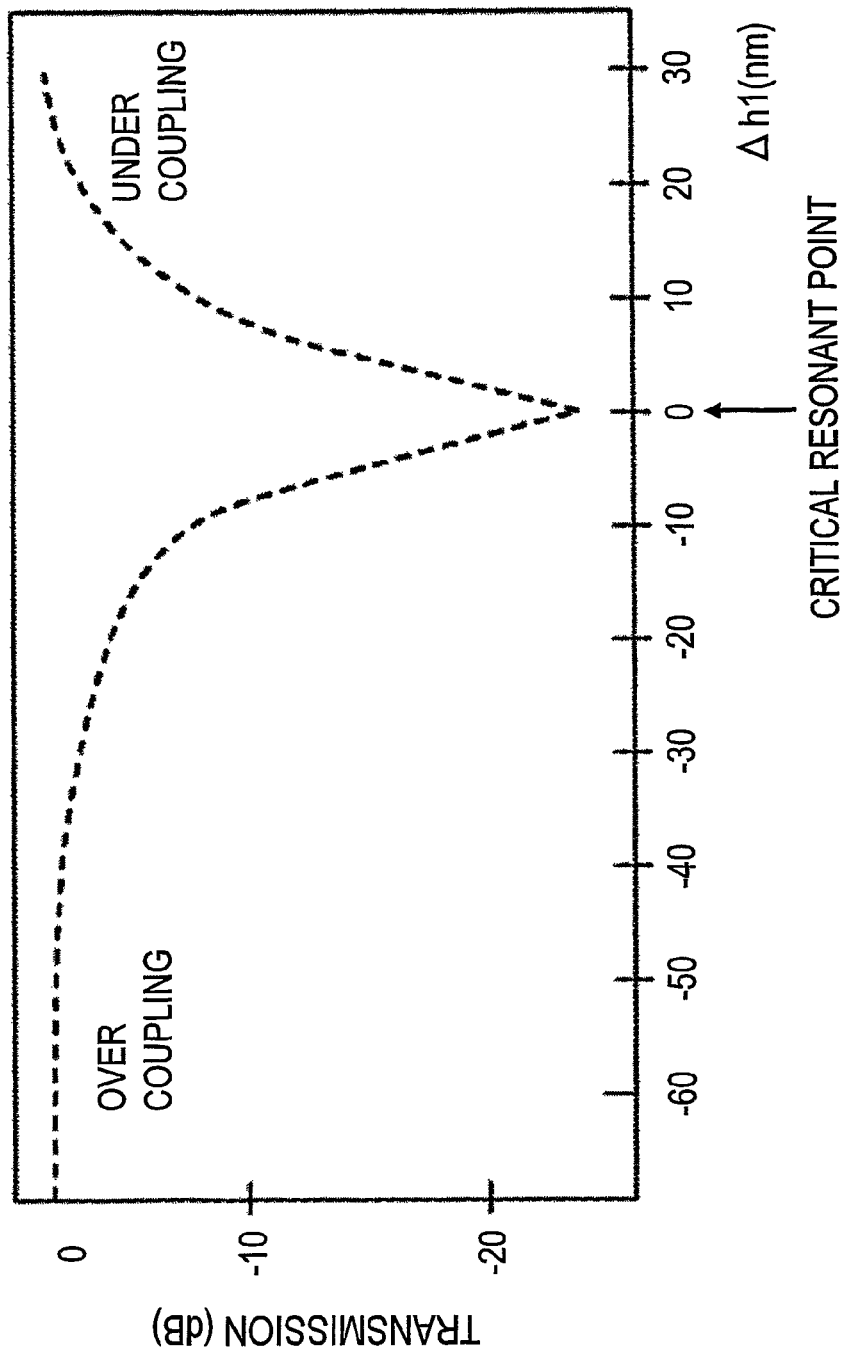
FIG. 3 is a view showing a change in the optical transmission power ratio with respect to a change $\Delta h1$ in a relative distance $h1$ between the waveguide and an optical resonator.

FIG. 3 is a view showing a change in the light transmission power ratio with respect to the change $\Delta$h1 in the relative distance h1 between the waveguide and the optical resonator. The condition for simulation is the same as that in FIG. 2. That is, it is the case where light of the same wavelength as the resonant wavelength enters the waveguide. In FIG. 3, the axis of ordinate represents the optical transmission power ratio (unit: dB) and the axis of abscissa represents the amount of change $\Delta$h1 in the distance (unit: nm). The coupling between the waveguides 16a, 16b and the optical resonator 15 forms three regions, an "under coupling", a "critical coupling" and an "over coupling", depending on the change $\Delta$h1 in the distance between the waveguide and the optical resonator. When the initial distance h1$o$ is set in the position of the critical coupling (i.e., in a state of $\Delta$h1=0), the optical transmission power ratio takes a minimum value of about −29 dB. Here, note that a region in which the change $\Delta$h1 is a negative value is the over coupling region. A region in which the change $\Delta$h1 is a positive value is the under coupling region. The sensitivity is the highest in the vicinity of the position of the critical coupling, and an optical transmission power ratio change of about 17 dB can be obtained by the amount of displacement of 5 nm in the vicinity of the position of the critical coupling.

Now, a qualitative explanation will be given in a concise manner in the case where the initial interval or distance is set in the position of the critical coupling, as stated above. It this case, it is assumed that an optical detector is connected to the second waveguide 16b.

When the membrane 11 does not receive an ultrasonic wave, the relation between the first waveguide 16a and the optical resonator 15, and the relation between the optical resonator 15 and the second waveguide 16b are in the critical coupling state. As a result, a part of light transmitting in the first waveguide 16a optically couples to the optical resonator 15. The optical resonator 15 takes the shape of a disk, a ring or the like, so light is transmitted to a peripheral portion of the optical resonator 15, and the energy of the light thus transmitted is confined in the interior of the optical resonator 15. Since the relative distance between the optical resonator 15 and the second waveguide 16b is also in the state of the critical coupling, the light that has moved from the first waveguide 16a to the optical resonator 15 couples to the second waveguide 16b light, and transmits in the second waveguide 16b. The light thus transmitted is detected by the optical detector.

On the other hand, when the membrane receives an ultrasonic wave and is thereby caused to displace, the relative distances between the optical resonator 15 and the waveguides 16a, 16b are changed, so that the optical coupling becomes an under coupling state or an over coupling state. As a result, among the light that has transmitted in the first waveguide 16a and has entered the ultrasonic sensor 10, a part thereof that couples to the optical resonator 15 decreases to a great extent, and the remaining part of the light that further transmits through the first waveguide 16a without optical coupling to exit from the ultrasonic sensor 10 increases accordingly. Therefore, the amount of light detected by the optical detector will be decreased.

In this manner, the ultrasonic wave can be detected. That is, in this embodiment, the first optical coupling coefficient between the first waveguide 16a and the optical resonator 15 and the second optical coupling coefficient between the second waveguide 16b and the optical resonator 15 are caused to change in accordance with the displacement of the membrane 11 generated by the reception of the ultrasonic wave.

The arrangement of the detector is not particularly limited, and the detector may be arranged in such a manner that it is connected to the first waveguide 16a. In that case, contrarily to the above explanation, the amount of light detected becomes larger when an ultrasonic wave is received by the membrane 11 than when no ultrasonic wave is received.

This embodiment is an example that is provided with one optical resonator and two optical waveguides as optical elements of the ultrasonic sensor 10. The positional relations of these optical resonator and waveguides are not limited to those shown in FIGS. 1A and 1B, as long as the detection of an ultrasonic wave can be made based on a similar principle. For example, the arrangement may be such that the first waveguide 16a and the second waveguide 16b are fixedly secured to the membrane 11, and the base plate 13 is fixedly secured to the optical resonator 15. However, it is preferable from the viewpoint of the manufacturing process that the optical resonator 15 be fixedly secured to the membrane 11.

(More Preferable Condition)

In order to detect the displacement of the membrane 11 in a reliable manner, it is preferable that the position of the optical resonator support member 14 be arranged so as to avoid a node for a vibration mode of the membrane 11. Also, it is desirable that the distance from the node for the vibration mode of the membrane 11 to the optical resonator support member 14 be equal to or larger than ⅛, and more preferably ³⁄₁₆, of a mode shape wavelength (i.e., a length or distance from the node to an adjacent node). A maximum amount of displacement of the membrane 11 will be generated when the distance from the node for the vibration mode of the membrane 11 to the optical resonator support member 14 is ¼ of the mode shape wavelength. About 70% of the maximum amount of displacement is generated when the distance is ⅛ of the mode shape wavelength under a similar mechanical environment and on the condition of a similar external force. Similarly, about 90% of the maximum amount of displacement is generated when the distance is ³⁄₁₆ of the mode shape wavelength.

Further, in order to avoid resonance between the membrane 11 and the optical resonator 15, it is desirable that a first resonant frequency (fundamental resonant frequency) of the optical resonator 15 be larger than a second resonant frequency of the membrane 11. It is necessary to set the operating band of an ultrasonic transducer to be between a first resonant frequency and the second resonant frequency of the membrane 11, and to set the resonant frequency of the optical resonator 15 to be larger than the second resonant frequency of the membrane 11. It is the most desirable that the resonant frequency of the optical resonator 15 be larger than a third resonance frequency of the vibration membrane 11.

For the purpose of suppressing optical coupling of the optical resonator 15 to locations other than the waveguides 16a, 16b, it is desirable that a distance h3 between the optical resonator 15 and the membrane 11 be equal to or larger than the optical wavelength. Also, it is desirable that a distance w1 between the optical resonator 15 and the vibration membrane support member 12 be equal to or larger than the optical wavelength. In addition, it is desirable that a distance h2 between the waveguide 16a and the base plate 13 is equal to or larger than the optical wavelength.

In order to improve the effect of confining optical energy, it is more desirable that materials for the optical resonator 15 and the waveguides 16a, 16b have a high dielectric constant or permittivity (e.g., relative dielectric constant ∈r>2). To this end, Si is the most desirable material because it is easy to perform fine processing. It is also desirable that materials for the optical resonator support member 14 have a low dielectric constant or permittivity (e.g., relative dielectric constant ∈r<2) so as to prevent light from being leaked into the optical resonator support member 14. Thus, SiO is the most desirable material because it is easy to perform fine processing. It is more desirable to use Si and SiO from the viewpoint of the manufacturing process. Therefore, in FIGS. 1A and 1B, a hatched region represents SiO, and the other region represents Si. The waveguide support members 18a, 18b serve to fix the waveguides 16a, 16b by connecting them with the base plate 13 by the use of SiO so as to prevent leakage of the light transmitting through the waveguides 16a, 16b.

Here, note that these conditions are similarly applicable to other embodiments to be described later.

Second Embodiment

This second embodiment is an example that is provided with one optical resonator and one optical waveguide as optical elements of the ultrasonic sensor 10. The various positional relations of the optical elements which can be conceived in this embodiment are shown in FIGS. 4A through 4F.

Figure 4A:
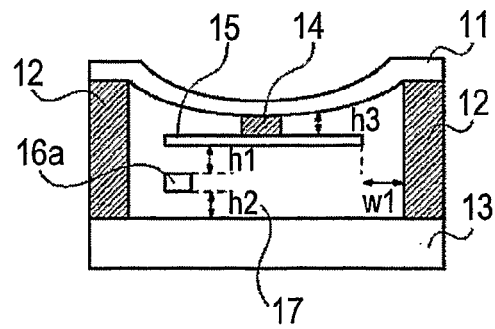
FIGS. 4A through 4F are different cross sectional views of an ultrasonic sensor according to a second embodiment of the present invention.

A waveguide 16a in FIG. 4A is to transmit the light incident thereto from a light source, and an optical detector is arranged at a location forwardly (in a transmission direction of light) of the waveguide 16a. In this second embodiment, a relative distance between the waveguide 16a and an optical resonator 15 is caused to change due to the displacement of a membrane 11 generated by the reception of an ultrasonic wave, so that an optical coupling coefficient between the waveguide 16a and the optical resonator 15 is thereby changed. This change in the optical coupling coefficient affects the amount or wavelength of the light detected by the optical detector, so it is possible to detect the ultrasonic wave.

That is, an ultrasonic sensor 10 outputs an optical signal corresponding to the optical coupling coefficient (the degree of optical coupling) between the first waveguide 16a and the optical resonator 15, which is caused to change due to reception of the ultrasonic wave.

In the ultrasonic sensor of FIG. 4A, light from the light source is transmitted to the waveguide 16a, from which the light enters the ultrasonic sensor 10. If optical coupling is in a critical coupling state when the membrane 11 receives no ultrasonic wave, i.e., an interval or distance between the optical resonator 15 and the waveguide 16a is an initial interval or distance h1o, most of the light transmitting through the waveguide 16a optically couples to the optical resonator 15. The optical resonator 15 takes the shape of a disk, a ring or the like, so light is transmitted to a peripheral portion of the optical resonator 15, and the energy of the light thus transmitted is confined in the interior of the optical resonator 15. Therefore, the amount of light detected by the optical detector is small.

On the other hand, when the relative distance (h1) between the waveguide 16a and the optical resonator 15 is changed upon reception of an ultrasonic wave, optical coupling becomes out of the critical coupling state, so most of the light transmitting through the waveguide 16a is detected as it is by the optical detector.

In this manner, the ultrasonic wave can be detected.

The positional relation of the optical resonator 15 and the waveguide 16a is not limited to that shown in FIG. 4A, as long as the detection of an ultrasonic wave can be made based on a similar principle.

Figure 4D:
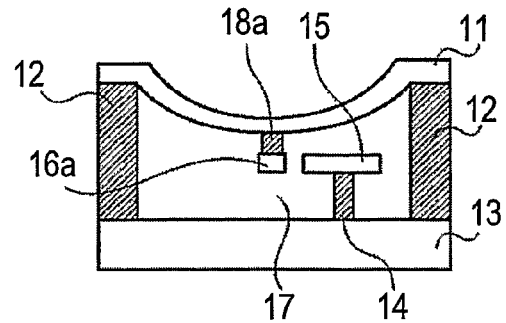
Figure 4B:
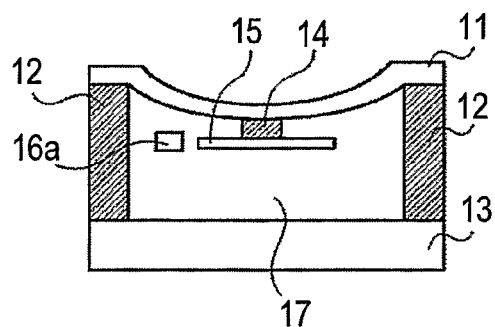

In FIG. 4B, there is shown an example in which the waveguide 16a is arranged at a side surface of the optical resonator 15. Though a support member for the waveguide 16a is omitted, the waveguide 16a is connected with and fixedly secured to the base plate 13 by the use of SiO so as to prevent leakage of light. Even with such a positional relation, the relative distance between the waveguide 16a and the optical resonator 15 is changed in accordance with the displacement of the membrane 11.

In this case, it is desirable that the initial relative positions of the waveguide 16a and the optical resonator 15 (a state in which no external force is applied) be in the vicinity of the critical coupling.

Figure 4E:
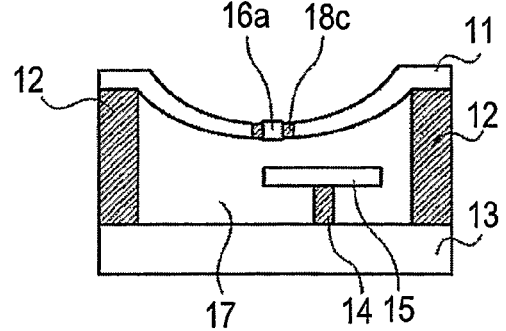
Figure 4C:
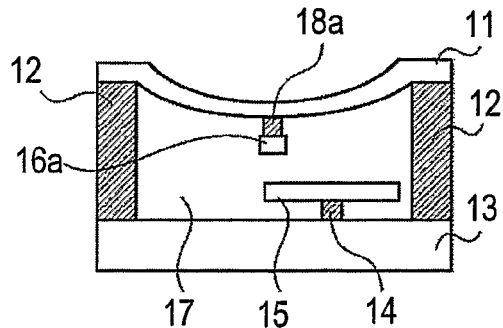

In FIG. 4C, there is shown an example in which a waveguide 16a is fixedly secured to a membrane 11 by being connected with a waveguide support member 18a. An optical resonator 15 is fixedly secured to a base plate 13 by means of an optical resonator support member 14. The optical waveguide 16a is arranged over a peripheral portion of the optical resonator 15 in the same spatial arrangement as in FIG. 4A.

In this case, it is desirable that the initial relative positions of the waveguide 16a and the optical resonator 15 (a state in which no external force is applied) be in the vicinity of the critical coupling, as shown in the above-mentioned FIG. 4B.

In FIG. 4D, there is shown an example in which a waveguide 16a is fixedly secured to a membrane 11 by being connected with a waveguide support member 18a, the waveguide 16a being arranged at a side surface of an optical resonator 15.

In this case, it is desirable that the initial relative positions of the waveguide 16a and the optical resonator 15 (a state in which no external force is applied) be in the vicinity of the critical coupling, as shown in the above-mentioned FIG. 4B.

In FIG. 4E, there is shown an example in which a waveguide 16a is embedded in a membrane 11 through a waveguide clad layer 18c. In order to obtain an optical confinement effect of the waveguide 16a, it is preferable to provide the waveguide clad layer 18c. The optical confinement effect can be ensured by using, as the waveguide clad layer 18c, a material which has a refractive index lower than that of the waveguide 16a so as to prevent leakage of light inside the waveguide 16a to the membrane 11. For example, in case where the waveguide 16a is made of Si, the waveguide clad layer 18c can be formed of SiO by means of a selective oxidation method or a CVD (Chemical Vapor Deposition) method. Accordingly, the refractive index of SiO (about 1.46) is smaller than that of Si (about 3.42), so the optical confinement effect can be ensured at an interface between SiO and Si due to the total reflection thereof. An optical resonator 15 is fixedly secured to a base plate 13 by means of an optical resonator support member 14. In case where the waveguide 16a is made of Si, it is desirable that the waveguide clad layer 18c be made of SiO. The optical waveguide 16a is arranged over a peripheral portion of the optical resonator 15 in the same spatial arrangement as in FIG. 4C.

In this case, it is desirable that the initial relative positions of the waveguide 16a and the optical resonator 15 (a state in which no external force is applied) be in the vicinity of the critical coupling, as shown in the above-mentioned FIG. 4B.

Figure 4F:
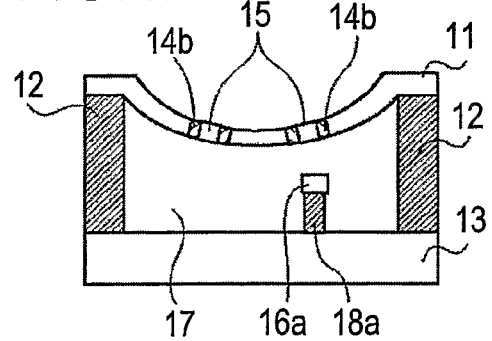

In FIG. 4F, there is shown an example in which an optical resonator 15 of a ring shape (or disk shape) is embedded in a membrane 11 through a resonator clad layer 14b. In order to obtain an optical confinement effect of the optical resonator 15, it is preferable to provide the resonator clad layer 14b. An optical waveguide 16a is fixedly secured to a base plate 13 by means of a waveguide support member 18a. In case where the optical resonator 15 is made of Si, it is desirable that the resonator clad layer 14b be made of SiO. The optical waveguide 16a is arranged under a peripheral portion of the optical resonator 15 in the same spatial arrangement as in FIG. 4A.

In this case, it is desirable that the initial relative positions of the waveguide 16a and the optical resonator 15 (a state in which no external force is applied) be in the vicinity of the critical coupling, as shown in the above-mentioned FIG. 4B.

Third Embodiment

Figure 5:
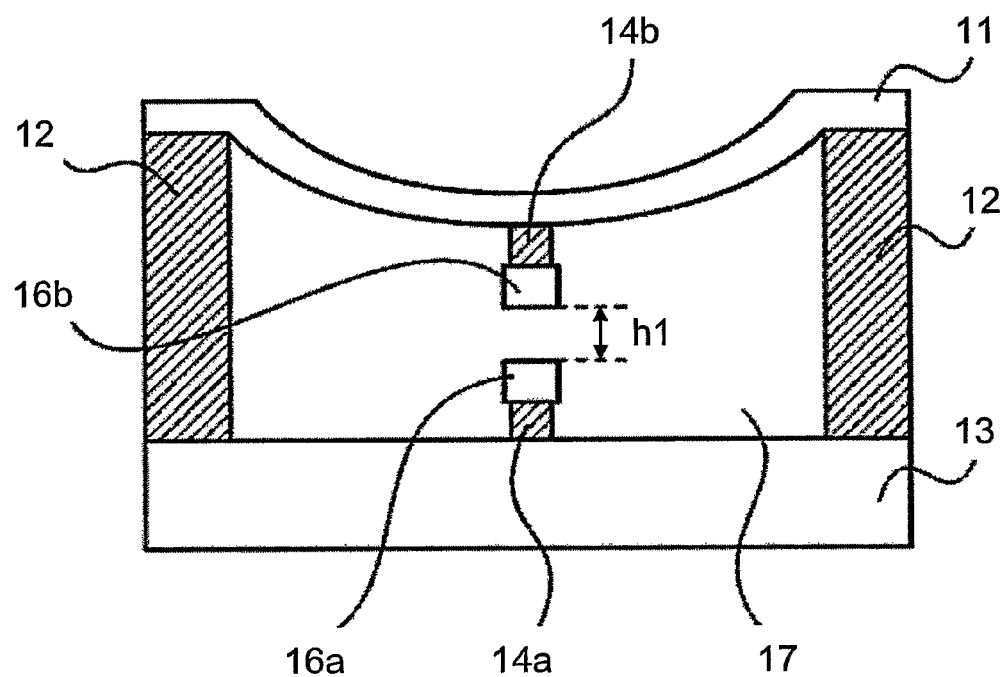
FIG. 5 is a cross sectional view of an ultrasonic sensor according to a third embodiment of the present invention.

This third embodiment is an example that is provided with two optical waveguides as optical elements of the ultrasonic sensor 10. FIG. 5 shows a cross sectional view of the ultrasonic sensor of this embodiment.

A waveguide 16a in FIG. 5 is a first waveguide for transmitting the light incident thereto from a light source, and an optical detector is arranged at a location forwardly (in a transmission direction of light) of the waveguide 16a. A waveguide 16b is a second waveguide in which the light that optically couples from the waveguide 16a transmits. In this third embodiment, a relative distance between the first waveguide 16a and the second waveguide 16b is caused to change due to the displacement of a membrane 11 generated by the reception of an ultrasonic wave, so that an optical coupling coefficient between the first waveguide 16a and the second waveguide 16b is thereby changed. This change in the optical coupling coefficient affects the amount or wavelength of the light detected by the optical detector, so it is possible to detect the ultrasonic wave.

That is, the ultrasonic sensor 10 outputs an optical signal corresponding to the optical coupling coefficient between the first waveguide 16a and the second waveguide 16b, which is caused to change due to reception of the ultrasonic wave.

The positional relation of the first waveguide 16a and the second waveguide 16b and the arrangement of the optical detector are not limited to those shown in FIG. 5, as long as the detection of an ultrasonic wave can be made based on a similar principle.

Fourth Embodiment

This fourth embodiment is an example that is provided with two optical resonators as optical elements of the ultrasonic sensor 10. One or two waveguides can be used depending on the relation thereof to a detector for light. The detection principle of this fourth embodiment is more or less different from that of the first to third embodiments as referred to above, so the detection principle of this fourth embodiment will be described following the construction of an ultrasonic sensor.

Figure 6:
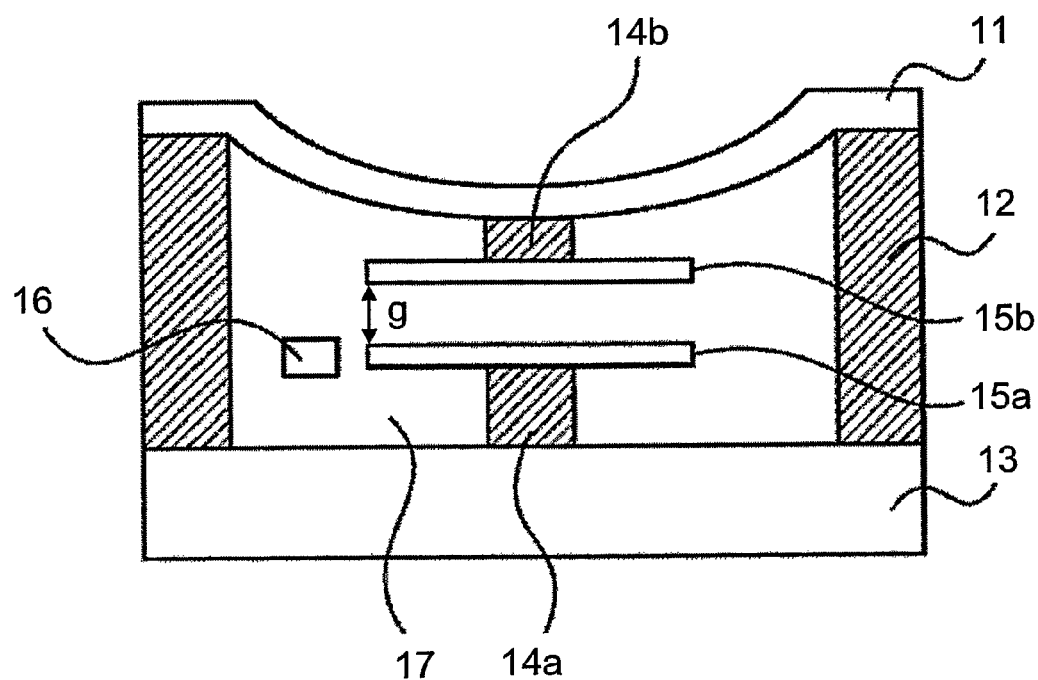
FIG. 6 is a cross sectional view of an ultrasonic sensor provided with a single waveguide according to a fourth embodiment of the present invention.

FIG. 6 shows a cross sectional view of the ultrasonic sensor provided with a single waveguide in this fourth embodiment of the present invention. A membrane 11 supported by a vibration membrane support member 12 on a base plate 13 receives an ultrasonic wave. A first optical resonator 15a is mounted on the base plate 13 by means of a first resonator support member 14a, and at a side surface of the first optical resonator 15a there is arranged a waveguide 16 in which light incident from a light source transmits. The waveguide 16 is connected to an optical detector (not shown). Over an upper portion of the first optical resonator 15a, there is arranged a second optical resonator 15b that is fixedly secured to the membrane 11 by means of a second resonator support member 14b. In other words, the second optical resonator 15b is able to move together with the displacement of the membrane 11, but the first optical resonator 15a is fixed to the base plate 13 and hence does not move.

An interval or distance g between the first optical resonator 15a and the second optical resonator 15b is changed in accordance with the vibration of the membrane 11. A part of the light from the light source transmits through the waveguide 16 and couples to the first optical resonator 15a, and the remaining part of the light is detected by the optical detector.

In this fourth embodiment, a relative distance between the waveguide 16 and the first optical resonator 15a, which are optical elements adapted to cause optical coupling, is not changed at all by the displacement of the membrane 11. However, when the membrane 11 receives an ultrasonic wave and is thereby caused to displace, a relative distance g between the first optical resonator 15a and the second optical resonator 15b changes.

The speed of light that transmits in the interior of the first optical resonator 15a is changed by the change of the interval or distance g. As the interval g becomes smaller, the speed of light transmitting in the interior of the first optical resonator 15a decreases. On the contrary, as the interval g becomes larger, the speed of light transmitting in the interior of the first optical resonator 15a increases.

It is assumed that the relation between the waveguide 16 and the first optical resonator 15a is in a state of critical coupling in an initial state in which no ultrasonic wave is received. The speed of light transmitting in the interior of the lower or first optical resonator 15a is changed in accordance with the change of the interval g, so the state of critical coupling is broken, and the optical coupling shifts to an over coupling state or an under coupling state. As a result, an optical signal output from the waveguide 16 quickly changes. In short, the central frequency of the optical coupling of the entire optical system changes (shifts).

That is, the ultrasonic sensor 10 outputs an optical signal corresponding to the relative distance between the first optical resonator 15a and the second optical resonator 15b, which is caused to change due to reception of the ultrasonic wave.

Figure 7A:
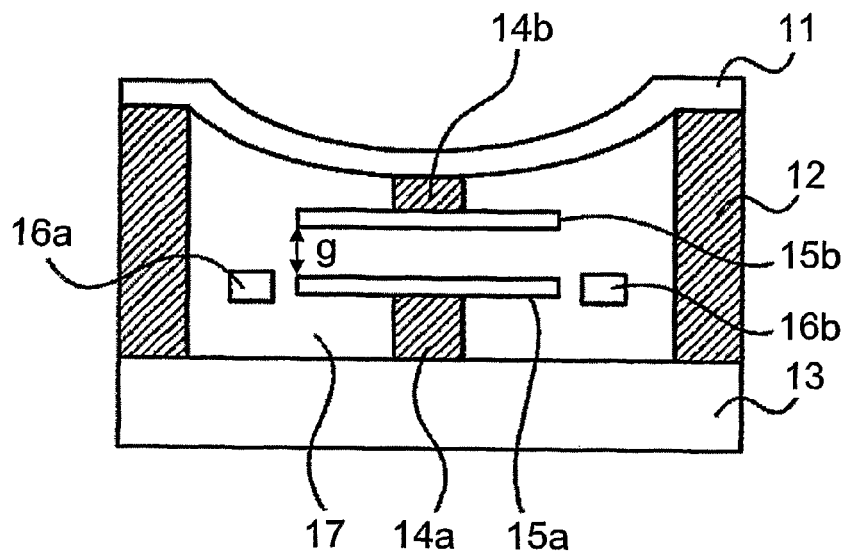
FIG. 7A is a cross sectional view of an ultrasonic sensor provided with two waveguides according to the fourth embodiment of the present invention.
Figure 7B:
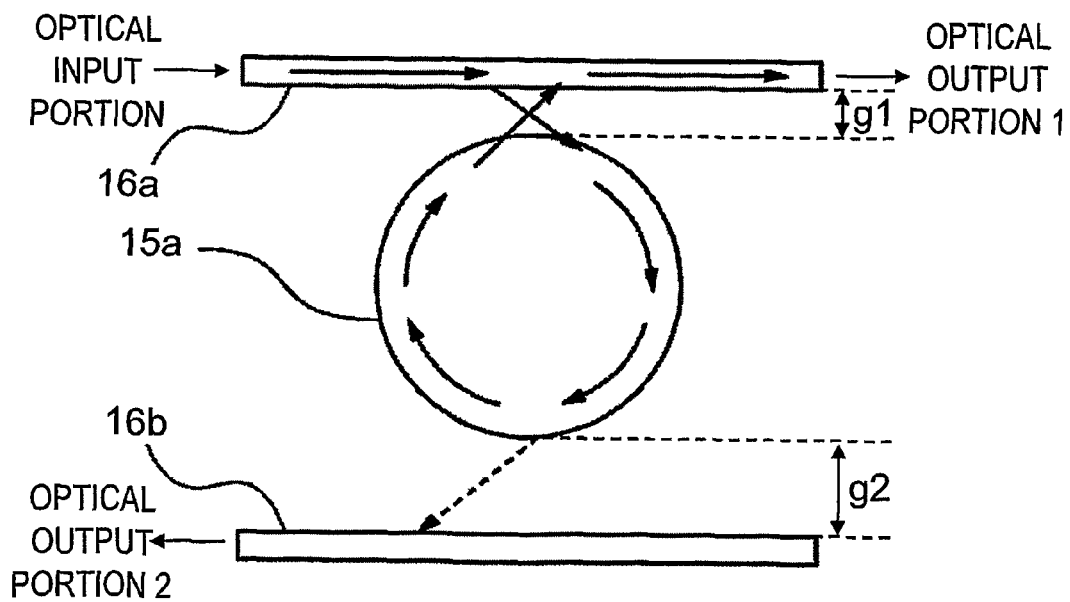
FIG. 7B is a view showing the two waveguides 16a, 16b and a lower optical resonator 15a of the ultrasonic sensor of FIG. 7A when seen from above.

FIG. 7A shows a cross sectional view of an ultrasonic sensor provided with two waveguides in this fourth embodiment of the present invention. FIG. 7B is a view showing two waveguides 16a, 16b and a lower or first optical resonator 15a of the ultrasonic sensor of FIG. 7A when seen from above.

The principle in this case is substantially the same as in the case of one waveguide. A part of the light from a light source transmits through a first waveguide 16a and couples to a first optical resonator 15a, and the remaining part of the light is detected by an optical detector (not shown). The remaining part of the light is detected at an optical output portion 1 in FIG. 7B. Those which are shown by arrows in FIG. 7B are optical paths along which the light travels. In the case of the single waveguide 16a being provided in the absence of the waveguide 16b, critical coupling is generated in a path indicated by solid line arrows. However, in the case of the two waveguides 16a, 16b being provided, energy of a part of the light moves to the second waveguide 16b, as shown by a broken line arrow, so the condition of generation of critical coupling changes.

Here, it is assumed that a relative distance between the first waveguide 16a and the first optical resonator 15a is g1, and that a relative distance between the second waveguide 16b and the first optical resonator 15a is g2. In particular, when g1 is equal to g2, critical coupling does not occur because a part of the energy of the light moves to the second waveguide 16b, as shown by the broken line arrow in FIG. 7B, in comparison with the case where critical coupling occurs only in the first waveguide 16a.

It is to be noted that when g2 and g1 are different from each other (e.g., g2>g1), the frequency and the interval g1 at which critical coupling is generated are changed by adjusting g2. Accordingly, the function of the second waveguide 16b is to adjust an optimal interval at which critical coupling is generated.

(Ultrasonic Sensor Array)

FIG. 8 shows one example of an ultrasonic sensor array making use of ultrasonic sensors of the present invention. The ultrasonic sensor array 30 is composed of a plurality of ultrasonic sensors 10 that are arranged to form an array. First of all, the light emitted from a light source 1 enters a spectroscope 2. The light having entered the spectroscope 2 transmits in a plurality of waveguides 16 and enters the individual ultrasonic sensors 10, respectively. In the ultrasonic sensors 10, the degree of optical coupling to optical elements such as optical resonators arranged in the ultrasonic sensors 10 are changed by reception of an ultrasonic wave, as already explained above. Lights coming out of the ultrasonic sensors 10 transmit through corresponding optical waveguides 16 and gather into a spectroscope 3. The optical transmission to the ultrasonic sensor array 20 can be modulated by means of the spectroscope 2 and the spectroscope 3. The spectroscopes 2, 3 are controlled by a control unit 5. Detection light from the spectroscope 3 is detected by means of an optical sensor 4 (detector). With such a construction, it is possible to detect an amount of displacement of a membrane in each ultrasonic sensor.

The one sample shown in FIG. 8 uses the above-mentioned second embodiment in which each of the ultrasonic sensors 10 is composed of an optical resonator and one waveguide. In FIG. 8, because of the positional relation of the two spectroscopes 2, 3, the waveguides 16 are drawn as being bent in the individual ultrasonic sensors 10, respectively. However, there is no limitation on the positional relation of the spectroscopes 2, 3, so it is also possible to arrange the waveguides 16 so as to extend through the ultrasonic sensors 10, respectively.

In case where two optical waveguides are used, detection light from an ultrasonic sensor transmits through another optical waveguide.

(Ultrasonic Imaging Apparatus)

FIG. 9 is a block diagram of an ultrasonic imaging apparatus making use of ultrasonic sensors of the present invention. This ultrasonic imaging apparatus includes an ultrasonic probe 90, a transmitting circuit system 93, and a receiving circuit system 92. The ultrasonic probe 90 is composed of an ultrasonic sensor array 30 of the present invention and an ultrasonic wave transmitting unit 99. An ultrasonic wave is generated based on a drive signal which is generated by the transmitting circuit system 93, and the ultrasonic wave thus generated is sent from the ultrasonic wave transmitting unit 99 to an object to be tested. The ultrasonic wave reflected from the object to be tested is detected by the ultrasonic sensor array 30 of the present invention, from which a detection signal is output to the receiving circuit system 92. The transmitting circuit system 93, the receiving circuit system 92, a displacement signal processing system 95, a tomographic signal processing system 94, and an image processing system 96 are controlled by a system control unit 97. The receiving circuit system 92 includes a photo detection element (detector) that serves to convert the received ultrasound signal into an optical signal, and a light source. The optical signal is converted into an electric signal by means of the photo detection element, and the electric signal thus obtained is output to the displacement signal processing system 95 and the tomographic signal processing system 94.

The tomographic signal processing system 94 includes an A/D converter that processes a detection signal input thereto, and converts it from an analog signal into a digital signal. According to such a signal processing operation, a plurality of surface data is formed based on the detection signal.

The image processing system 96 reconstructs two dimensional data or three dimensional data based on the plurality of surface data input from the tomographic signal processing system 94 and the displacement signal processing system 95. Further, the data thus reconstructed is subjected to processing such as interpolation, response modulation processing, gradation processing and so on, and the data thus processed is stored. An image display unit 98 is in the form of a display unit such as, for example, a CRT, an LCD, etc., and an image is displayed based on image data to which the above processing is applied.

(Manufacturing Methods)

In FIGS. 10A-10G, 11A-11K, 12A-12L, and 13A-13L, there are exemplified four manufacturing processes for an ultrasonic sensor according to the present invention.

For the purpose of simplifying the following explanation of the processes, let us assume that a process called "patterning" includes processes of coating, baking, exposing, and developing a photoresist of an appropriate thickness according to a photolithography method thereby to etch an underlying material lying underneath the photoresist, and a process of removing the photoresist thereafter.

(Manufacturing Method 1)

FIGS. 10A through 10G show one example of ultrasonic sensor manufacturing processes of the above-mentioned first embodiment of the present invention.

Figure 10A:
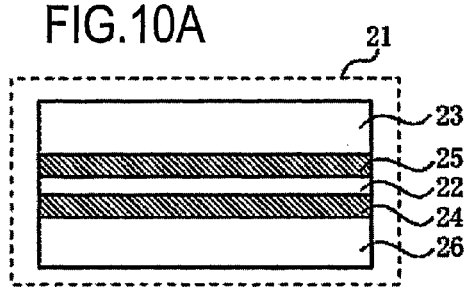
FIGS. 10A through 10G are views showing one example of ultrasonic sensor manufacturing processes of the first embodiment of the present invention.

First, a double SOI substrate 21 is cleaned and prepared, as shown in FIG. 10A. A schematic fabrication method for the double SOI substrate 21 will be described below. Device layers of two SOI (Silicon On Insulator) substrates are joined or bonded in opposition to each other, after which a handling layer on one side surface of the SOI substrates thus joined or bonded is etched to form the double SOI substrate 21 (KST World Corp.). Among the device layers, a top device layer 23 will become an optical resonator 15, so size adjustments according to optical propagation or transmission and process fabrication will be described later in detail.

A middle device layer 22 will become a membrane 11, so it is desirable that the thickness of the middle device layer 22 be about 0.2-5 µm because of an input mechanical impedance at which an ultrasonic wave is received. A first oxide film 25 will become an optical resonator support member 14. From the above explanation, it is preferable that the thickness of the first oxide film 25 be 0.2-4 µm, in order to avoid optical coupling between the membrane and the optical resonator.

Figure 10E:
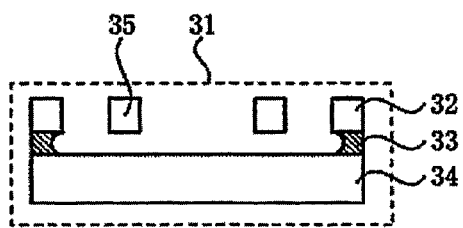
Figure 10B:
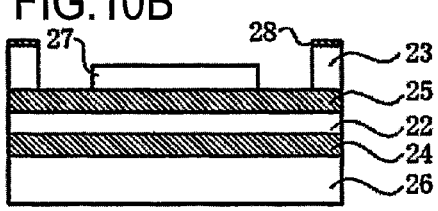

In FIG. 10B, the double SOI substrate in FIG. 10A is thermally oxidized, after which a thermal oxide film thus formed is subjected to patterning by means of wet etching. Then, using the oxide film thus subjected to patterning as an etching mask, Si of the top device layer is subjected to patterning by means of dry etching. Thus, by performing such patterning steps two times, an initial shape 27 of the optical resonator 15 is formed, as shown in FIG. 10B. Due to the selectivity and the etching rate or speed of the dry etching, it is desirable that the thickness of the above-mentioned oxide film used for the etching mask be about 10-3,000 nm, and most preferably about 50-500 nm. This etching mask is not limited to the thermal oxide film, but for such a purpose, there can also be used a silicon oxide film that is formed by means of an LPCVD (Low Pressure Chemical Vapor Deposition) method or a PECVD (Plasma Enhanced Chemical Vapor Deposition) method.

In order for light to transmit to the interior of the initial shape 27 of the optical resonator 15, it is preferable due to the reduction of carrier loss that resistivity be equal to or higher than 100 Ohm-cm, more preferably equal to or higher than 1,000 Ohm-cm, and most preferably equal to or higher than 10,000 Ohm-cm. Also, it is desirable that the thickness of the initial shape 27 of the optical resonator 15 be about 20-3,000 nm, and most desirably about 200-1,000 nm.

In addition, it is required that the top device layer 23 be the same material as that of the initial shape 27 thereof, and also have the same resistivity. A total amount of an initial interval or distance between the optical resonator 15 and the waveguide 16 and the thickness of the initial shape 27 of the above-mentioned optical resonator, or a total amount of the initial interval or distance between the optical resonator 15 and the waveguide 16 and the thickness of the thermal oxide film 28 for the etching mask, becomes equal to the thickness of the above-mentioned top device layer 23.

As described above, for the purpose of designing the initial state of optical coupling, it is desirable that the initial interval or distance between the optical resonator 15 and the waveguide 16 be 10-3,000 nm, and more desirably, 50-1,600 nm. Accordingly, it is desirable that the thickness of the above-mentioned top device layer 23 is 40-9,000 nm, more desirably, 200-2,000 nm, and most desirably, 300-1,000 nm.

Subsequently, in FIG. 10C, a SiN film 29 (silicon nitride film) is deposited on the initial shape or layer 27 and the thermal oxide film 28 according to the LPCVD method (low pressure chemical vapor deposition method), and is subjected to patterning by means of dry etching. Thereafter, the first oxide film 25 is etched with a liquid including hydrofluoric acid. After this wet etching, the etchant is changed or replaced by pure water, acetone and methanol in this order, and the substrate is dried by means of a supercritical drying method using carbon dioxide. For the sake of simplifying the description from now on, let us assume that the following "supercritical drying process" includes a preliminary process in which the etchant is replaced by pure water, acetone and methanol in this order, and a supercritical drying method which uses carbon dioxide.

Figure 10F:
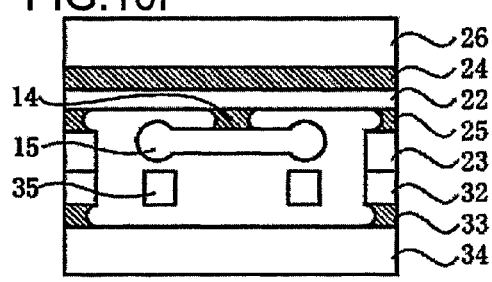
Figure 10C:
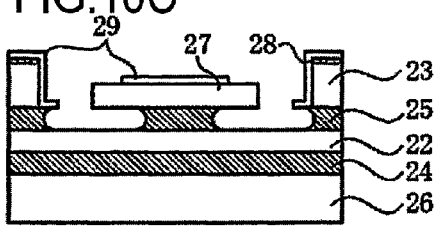
Figure 10G:
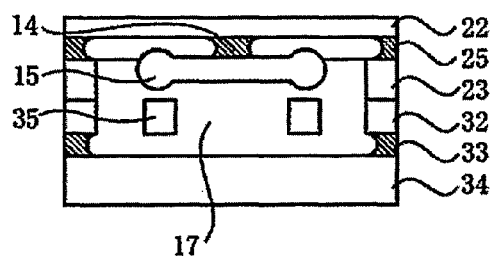
Figure 10D:
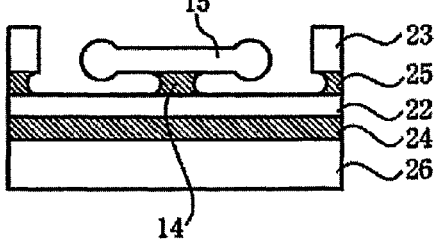

Then, in FIG. 10D, the substrate is annealed in a low-pressure hydrogen atmosphere. The following annealing condition is desirable: the temperature is 800-1,200 degrees C., and the pressure is 0.1-760 Torr. The most desirable annealing condition is as follows: the temperature is 1,000-1,150 degrees C., and the pressure is 1-100 Torr.

In order to make concise the description of the following hydrogen annealing process, let us assume that the condition for the following hydrogen annealing process is the same as the condition of FIG. 10D. According to the above-mentioned hydrogen annealing, migration of Si atoms, which lie on a surface of the initial shape 27 of the above-mentioned optical resonator that is in contact with hydrogen, is made active to generate a reflow effect, whereby the peripheral margin or edge of the initial shape 27 is rounded. Due to the presence of this round peripheral margin or edge, the loss of light transmitted to the interior of the peripheral margin or edge can be reduced to a great extent, so that a resonance effect or quality factor becomes substantially large, thus improving the performance of the optical resonator to detect the displacement of the membrane. Thereafter, the SiN film 29 is removed by means of a heated liquid containing phosphoric acid, or dry etching. The function of the above-mentioned SiN film 29 is to serve as a hydrogen barrier film at the time of hydrogen annealing so as to retain the surface flatness and the shape of Si in the center of the optical resonator 15 as necessary for the subsequent joining or bonding process. However, if the process is well controlled, it will also be possible to form the optical resonator 15 without the presence of this SiN film 29.

On the other hand, as shown in FIG. 10E, another SOI substrate 31 is prepared and cleaned, after which it is subjected to patterning to form a device layer 32 by means of dry etching. Then, a BOX (Buried Oxide) layer 33 is etched with a liquid containing hydrofluoric acid. Thereafter, optical waveguides 35 are formed according to the above-mentioned supercritical drying process. After this, hydrogen annealing may be applied as stated above, or may not be applied, and in either case, it is possible to perform optical transmission. To simplify the drawings, support members for the optical waveguides 35 are omitted in FIG. 10E, but in actuality, they serve to support, from below, the optical waveguides 35, respectively, that extend in a direction perpendicular to the plane of the drawing sheet of this figure.

Subsequently, as shown in FIG. 10F, the substrate of FIG. 10D is inverted and placed on the substrate of FIG. 10E in alignment therewith, so that these substrates are joined or bonded to each other. The purpose of the alignment is to arrange the peripheral margin or edge of the optical resonator 15 and the optical waveguides 35 in vertical alignment with each other. Here, it is desirable that the accuracy of alignment, i.e., deviation between the substrates, be equal to or less than 5 μm, and more desirably, equal to or less than 1 μm. Most desirably, it is equal to or less than 100 nm. In this regard, from the viewpoint of bonding strength, it is desirable that the bonding temperature be in the range from room temperature to 1,200 degrees C., more desirably in the range from 100 to 800 degrees C., and most desirably in the range from 300 to 400 degrees C. because of the consistency of electronic circuits. In order to make concise the description of the following hydrogen annealing process, let us assume that the condition for the following bonding annealing process is the same as the condition of FIG. 10F.

Then, in FIG. 10G, a handling layer 26 (Si) is wet etched with an alkaline etchant. The wet etching serves to protect a handling layer 34 lying on a backside surface of the substrate with the use of a one-side etching jig (e.g., a wafer holder for chemical etching manufactured by Silicet AG in Germany) so as to prevent damage thereof. In case where an alkaline etchant is used, the etching selectivity of the handling layer 26 (Si) with respect to a second oxide film 24 ($SiO_2$) is high, so the wet etching automatically stops when the second oxide film 24 ($SiO_2$) is reached. Thereafter, the second oxide film 24 ($SiO_2$) is etched by using a liquid containing hydrofluoric acid. In the case of using the liquid containing hydrofluoric acid, the etching selectivity of the silicon oxide film with respect to silicon is high, so it is possible to perform the etching in such a manner that the second oxide film 24 can be completely removed while preventing damage to the middle device layer 22. Then, by performing washing or cleaning with pure water and drying, an ultrasonic sensor according to the first embodiment of the present invention is completed. For the sake of making concise the description of the following processes, it is assumed that the following processes of removing the handling layers and the BOX layer are the same as those of FIG. 10G as long as other methods are not particularly described.

When an element array of a large area is to be prepared, the element shown in FIG. 10G should be annealed at high temperatures under atmospheric pressure or in a pressurized state in order to prevent imperfections in the joining or bonding of FIG. 10F. This process is called "post annealing". According to this process, the middle device layer 22 is pushed in under atmospheric pressure or pressurization to rejoin or rebond the top device layer (silicon) 23 and the device layer (silicon) 32 to each other. In addition, the joining or bonding uniformity in a large area and the sealing of the cavity 17 in the element can be improved. It is desirable that the post annealing temperature be in the range from room temperature to 1,200 degrees C., more desirably in the range from 100 to 800 degrees C., and most desirably in the range from 300 to 400 degrees C. because of the consistency of electronic circuits.

(Manufacturing Method 2)

FIGS. 11A through 11K show one example of ultrasonic sensor manufacturing processes of the above-mentioned fourth embodiment of the present invention.

Comparing these manufacturing processes of FIGS. 11A through 11K with the manufacturing processes shown in FIGS. 10A through 10G, they are featured in that the optical resonator support member 14 is made of silicon, and two optical resonators are particularly used.

Figure 11A:
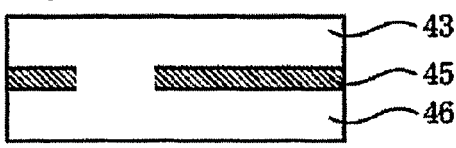
FIGS. 11A through 11K are views showing one example of ultrasonic sensor manufacturing processes of the fourth embodiment of the present invention.

First, one SOI substrate is cleaned and prepared, as shown in FIG. 11A. Thereafter, as shown in FIG. 11B, an oxide film 48 is deposited and subjected to patterning, and a device layer 43 is subjected to patterning as an etching mask.

Figure 11B:
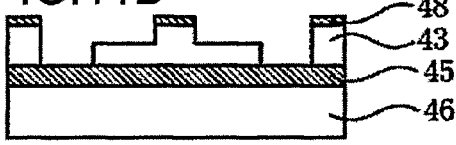
Figure 11C:
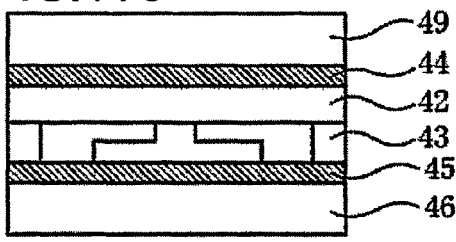
Figure 11D:
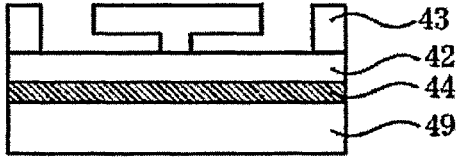
Figure 11E:
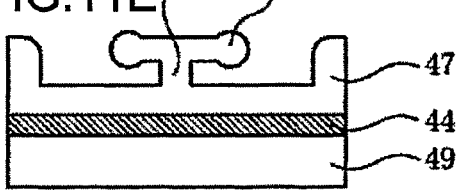
Figure 11F:
Figure 11G:
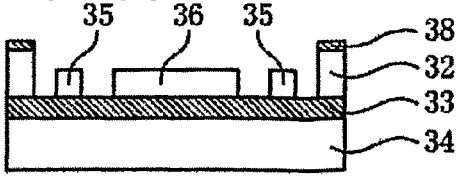
Figure 11H:
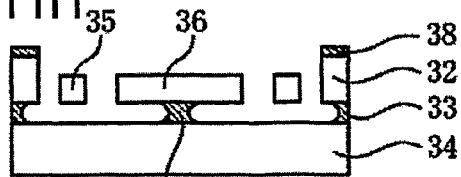

Then, using another SOI substrate, it is joined or bonded to the SOI substrate thus subjected to patterning in FIG. 11B. In this regard, care should be taken that device layers of both of the substrates are joined or bonded to each other, as shown in FIG. 11C. Thereafter, a handling layer 46 and a BOX layer 45 are removed, as shown in FIG. 11D. Here, note that in FIG. 11D, the patterned SOI substrate of FIG. 11C is shown as inverted. This removing process is the same as the process in FIG. 10G. Then, by applying hydrogen annealing, there are formed an optical resonator 15, an optical resonator support member 14, and a vibration membrane support member 47 after bonding and hydrogen annealing (FIG. 11E). This hydrogen annealing process is the same as that of FIG. 10D.

Subsequently, another SOI substrate is prepared, and the processes proceed in the order of FIGS. 11F, 11G, 11H and 11I, whereby optical waveguides 35 and another optical resonator 36 are formed on this SOI substrate. The detailed contents of the processes of the above-mentioned FIGS. 11F, 11G, 11H and 11I are the same as those of FIGS. 10A, 10B, 10C and 10D.

Figure 11I:
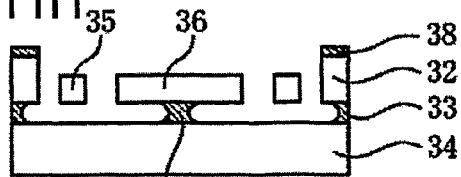
Figure 11J:
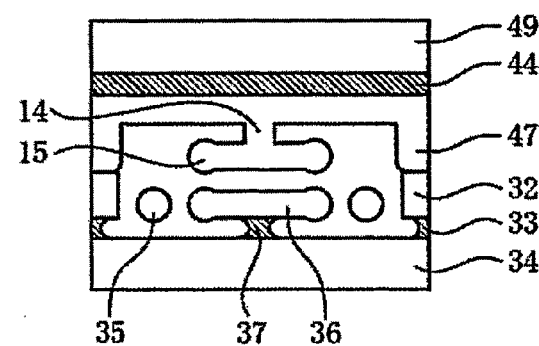
Figure 11K:
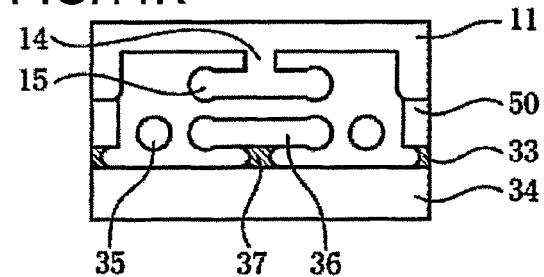

Then, the substrate shown in FIG. 11E is inverted and joined or bonded to the substrate shown in FIG. 11I, whereby a substrate cross section shown in FIG. 11J is formed. Here, it is desirable to align the two optical resonators in a precise manner. The detailed bonding process condition is the same as that of FIG. 10F. Thereafter, a handling layer 49 and a BOX layer 44 are removed, as shown in FIG. 11K. The detail of this process is the same as that of FIG. 10G.

(Manufacturing Method 3)

FIGS. 12A through 12L show one example of ultrasonic sensor manufacturing processes according to the above-mentioned first embodiment of the present invention. This manufacturing method 3 is different from the above-mentioned manufacturing method 1.

Optical coupling between optical resonators or between an optical resonator and an optical waveguide exerts a large influence on the performance of an ultrasonic sensor of the present invention, so an alignment process is important in the above-mentioned manufacturing method 1. This is alignment due to joining or bonding.

In the manufacturing processes according to this manufacturing method 3, alignment is performed by means of photolithography without using the alignment due to joining or bonding, in order to improve the accuracy of alignment between an optical resonator and an optical waveguide. For example, the optical resonator and the optical waveguide are patterned by the use of a stepper. Therefore, the alignment accuracy can be made equal to or less than 1 µm, and furthermore equal to or less than 100 nm.

Figure 12A:
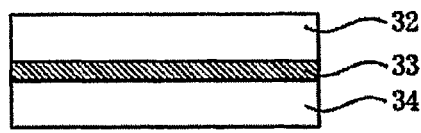
FIGS. 12A through 12L are views showing another example of ultrasonic sensor manufacturing processes of the first embodiment of the present invention.
Figure 12B:
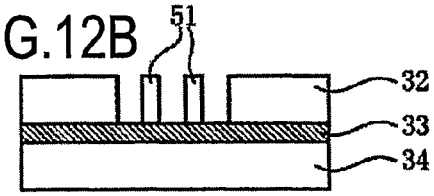

First, one SOI substrate is cleaned and prepared, as shown in FIG. 12A. Thereafter, a device layer 32 is patterned to form a temporary silicon support member 51 for an optical resonator, as shown in FIG. 12B. This temporary silicon support member 51 for an optical resonator takes a columnar shape or a ring-shape. After that, the temporary silicon support member 51 for an optical resonator is completely thermally oxidized. Therefore, from the viewpoint of the processing time of the thermal oxidation, it is desirable that the width of the temporary silicon support member 51 for an optical resonator be equal to or less than 5 µm, and more desirably, equal to or less than 3 µm.

Figure 12C:
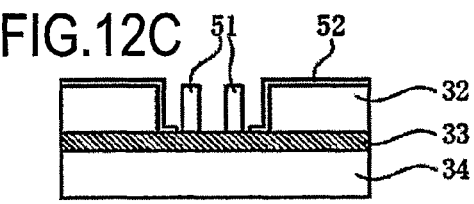

Then, a SiN film 52 is deposited, as shown in FIG. 12C, and is subjected to patterning. Thereafter, by applying thermal oxidation, the temporary silicon support member 51 for an optical resonator is completely oxidized to form temporary SiO support members 53 for an optical resonator.

Figure 12D:
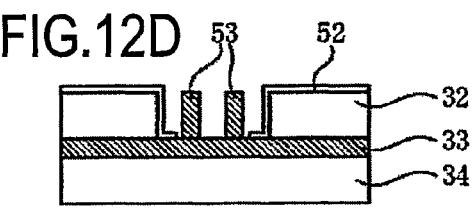
Figure 12E:
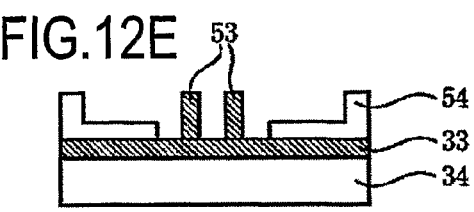
Figure 12F:
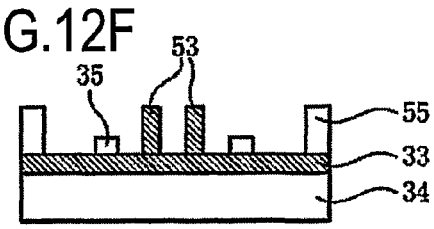

Since only the temporary silicon support member 51 for an optical resonator is not covered with the SiN film 52, as shown in FIG. 12D, only the silicon surface thereof is thermally oxidized. This is called "selectivity oxidation". Then, the SiN film 52 is removed, the device layer 32 is patterned, as shown in FIG. 12E, so that an etched shape becomes device layers 54. Thereafter, the device layers 54 are patterned, as shown in FIG. 12F, whereby optical waveguides 35 and device layers 55 are formed.

Figure 12G:
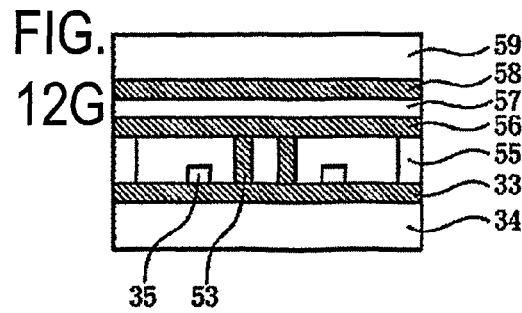

Subsequently, a device layer 56 of the another SOI substrate is thermally oxidized to form a thermal oxide film 56, and is thereafter joined or bonded onto the above-mentioned substrate shown in FIG. 12F, whereby a cross-sectional structure as shown in FIG. 12G can be formed. The bonding process condition in this case is the same as that of FIG. 10F.

Figure 12H:
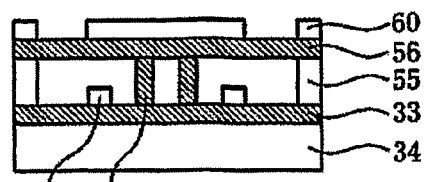

Then, a handling layer 59 and a BOX layer 58 are removed, as shown in FIG. 12H, and a device layer 57 is subjected to patterning by means of dry etching to form device layers 60. When the device layer 57 is subjected to patterning, the alignment accuracy of the optical waveguides 35 can be improved by the use of the stepper. A method of removing the handling layer 59 and the BOX layer 58 is the same as the method described with respect to FIG. 10G. In particular, in order to improve the uniform close contact of the thermal oxide film 56 with the temporary SiO support members 53 for an optical resonator and the device layers 55, as shown in FIG. 12G, the post annealing method described with respect to FIG. 10G is used.

Figure 12I:
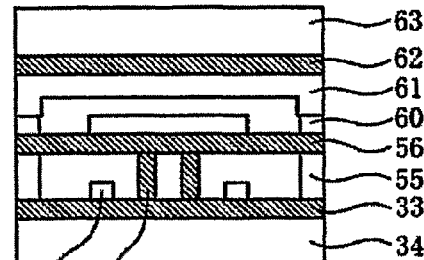

Thereafter, by using an additional SOI substrate, a device layer 61 thereof is subjected to patterning and is joined or bonded to the substrate shown in FIG. 12H. This process is to join or bond the device layer 61 to be patterned and the device layers 60 to each other, as shown in FIG. 12I. The detailed bonding process condition in this case is the same as that of FIG. 10F.

Figure 12J:
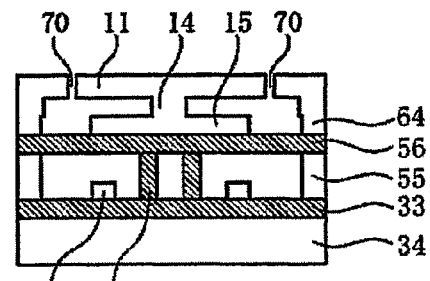

Then, a handling layer 63 and a BOX layer 62 are removed, as shown in FIG. 12J, and the device layer 61 is subjected to patterning by means of dry etching, whereby a device layer 64 is formed. A method of removing the above-mentioned handling layer 63 and the BOX layer 62 is the same as the method as described with respect to FIG. 10G. Thereafter, the device layer 64 is dry etched to form small holes 70. Here, it is desirable that the small holes 70 have groove shapes with the center of a membrane 11 being an axis of symmetry, and most desirably, they be circular apertures. In case where the small holes 70 are circular apertures, it is desirable that the diameter of each hole be equal to or less than 2 µm, more desirably equal to or less than 1 µm, and most desirably equal to or less than 0.5 µm.

Subsequently, the oxide film 56 and the temporary SiO support members 53 for an optical resonator are etched by causing a steam containing hydrofluoric acid to pass through the small holes 70. Though this etching can use an etchant containing hydrofluoric acid, it is necessary, after such wet etching, to perform rinsing with pure water and to apply the above-mentioned supercritical drying process. In this case, it is difficult to replace or remove pure water completely, and it takes time to completely blow off the remaining liquid from the small holes 70, so it is desirable to perform etching with a steam containing hydrofluoric acid.

Figure 12K:
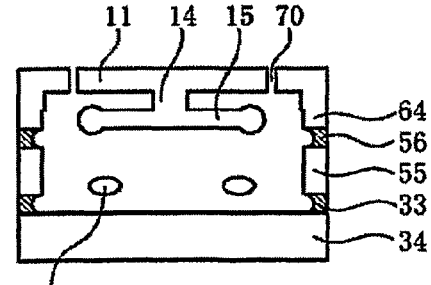
Figure 12L:
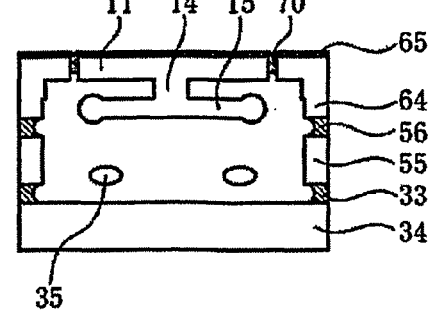

Thereafter, by applying hydrogen annealing, there are formed an optical resonator 15, an optical resonator support member 14, the optical waveguides 35, and the vibration membrane support member 64 after bonding, as shown in FIG. 12K. This hydrogen annealing process is the same as that of FIG. 10D, and hydrogen passes through the small holes 70, and rounds the peripheral margins or edges of the optical resonator 15 and the optical waveguides 35.

Finally, by providing a sealing film 65 for sealing the small holes 70 in the surface of the membrane 11, the ultrasonic sensor is completed. This sealing film 65 is a SiN film, a silicon film, or a SiO film, which is deposited or formed by means of a CVD (Chemical Vapor Deposition) method, or a PVD (Physical Vapor Deposition) method. According to this manufacturing method, alignment can be made by means of a photolithography method without using bonding alignment, so the accuracy of alignment can be improved.

(Manufacturing Method 4)

FIGS. 13A through 13L show one example of ultrasonic sensor manufacturing processes of the above-mentioned fourth embodiment of the present invention. This manufacturing method 4 is differing from the above-mentioned manufacturing method 2 in that alignment is made by means of a photolithography method, as shown in FIGS. 12A through 12L.

Figure 13A:
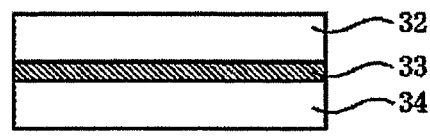
FIGS. 13A through 13L are views showing another example of ultrasonic sensor manufacturing processes of the fourth embodiment of the present invention.
Figure 13B:
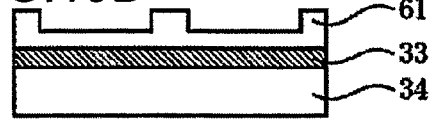

First, one SOI substrate is cleaned and prepared, as shown in FIG. 13A. Then, a device layer 32 of the substrate of FIG. 13A is subjected to patterning to form a device layer 61, as shown in FIG. 13B. Thereafter, the substrate of FIG. 13B is thermally oxidized to form a device layer 69 and a thermal oxide film 38, as shown in FIG. 13C.

Figure 13C:
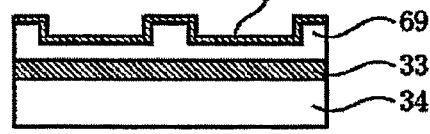
Figure 13D:
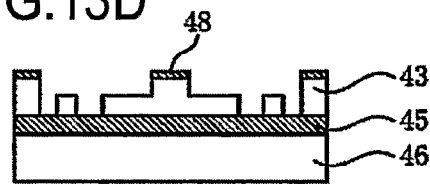

On the other hand, by using another SOI substrate, the device layer 69 and the thermal oxide film 38 are subjected to the same process as in FIG. 11B, whereby device layers 43 and thermal oxide films 48 are formed, as shown in FIG. 13D.

Figure 13E:
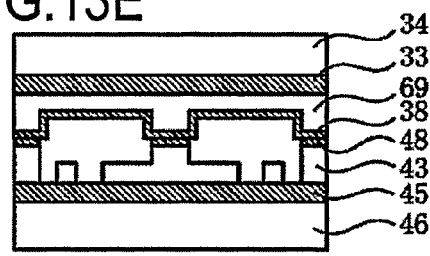
Figure 13F:
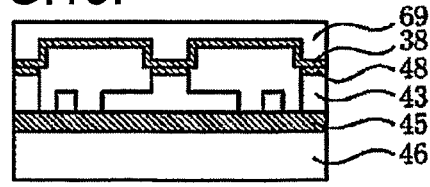

Then, the substrate completed in FIG. 13C is inverted and joined or bonded onto the substrate completed in FIG. 13D, whereby a substrate cross section after bonding as shown in FIG. 13E is formed. Thereafter, a handling layer 34 and a BOX layer 33 are removed, as shown in FIG. 13F. In order to improve the uniformity of the bonding, it is desirable to apply post annealing immediately after the removal process.

Figure 13G:
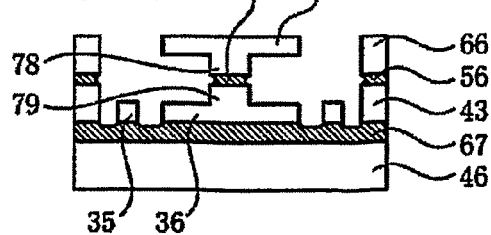

Subsequently, the device layer 69 is subjected to patterning by using a stepper and dry etching, as shown in FIG. 13G. By making alignment with the use of the stepper, the accuracy of alignment between an upper optical resonator 15, a lower optical resonator 36 and optical waveguides 35 can be made equal to or less than 1 μm, and furthermore, it can even be made equal to or less than 100 nm, too. The upper optical resonator 15 is connected with the lower optical resonator 36 through a temporary SiO support member 81 for the upper optical resonator. A pair of interval adjusting portions 78, 79 are arranged at opposite sides of the temporary SiO support member 81 for the upper optical resonator, so that an interval or distance between the upper and lower optical resonators 15, 36 is thereby adjusted so as to control an initial state of optical coupling therebetween.

Figure 13H:
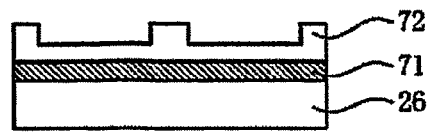
Figure 13I:
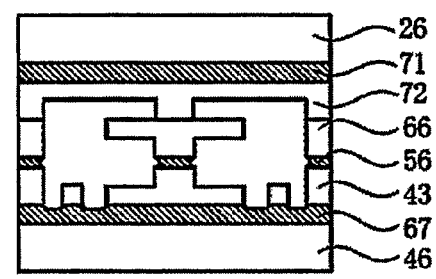
Figure 13J:
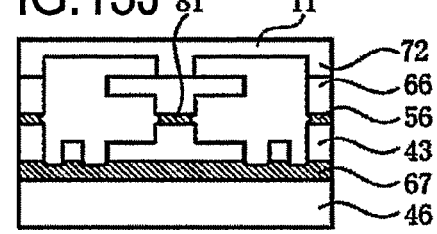

Thereafter, an additional SOI substrate is prepared, and a device layer thereof is subjected to patterning, so that a cross sectional structure of the substrate as shown in FIG. 13H is formed. Then, the substrate completed in FIG. 13H is inverted and joined or bonded onto the substrate completed in FIG. 13G, whereby a substrate cross sectional structure as shown in FIG. 13I is formed. After that, a handling layer 26 and a BOX layer 71 of the above-mentioned substrate are removed, as shown in FIG. 13J, and a post annealing process is applied, whereby a membrane 11 is formed.

Figure 13K:
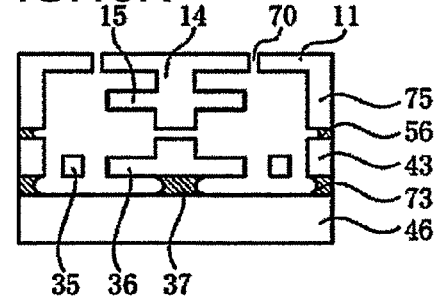
Figure 13L:
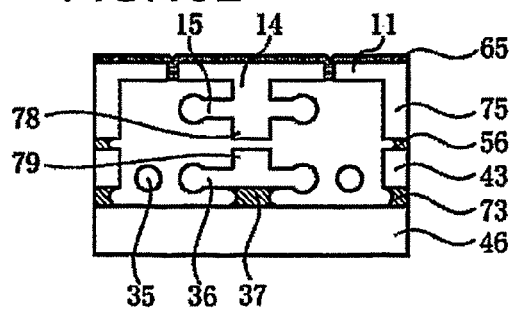

Subsequently, in order to remove the temporary SiO support member 81 for the upper optical resonator, the membrane 11 is subjected to patterning by means of dry etching to form small holes 70, as shown in FIG. 13K. Thereafter, similar to FIG. 12K, by causing a steam containing hydrofluoric acid to pass through the small holes 70, a BOX layer 67 is etched while removing the temporary SiO support member 81 for the upper optical resonator, whereby a substrate cross-sectional structure is fabricated, as shown in FIG. 13K. Here, it is to be noted that the temporary SiO support member 81 for the upper optical resonator is removed, but it is necessary to leave a support member 37 for the lower optical resonator 36.

Then, by applying hydrogen annealing, there are formed the optical resonators 15, 36, the optical resonator support members 14, 37, the optical waveguides 35, and the vibration membrane support member 75 after bonding, as shown in FIG. 13K. This hydrogen annealing process is the same as that of FIG. 10D, and hydrogen passes through the small holes 70, and rounds the peripheral margins or edges of the optical resonators 15, 36 and the optical waveguides 35.

Finally, by providing a sealing film 65 for sealing the small holes 70 in the surface of the membrane 11, the ultrasonic sensor is completed.

The present invention is not limited to the above embodiments and various changes and modifications can be made within the spirit and scope of the present invention. Therefore, to apprise the public of the scope of the present invention, the following claims are made.

This application claims the benefit of Japanese Patent Application No. 2007-219925, filed on Aug. 27, 2007, which is hereby incorporated by reference herein in its entirety.

The invention claimed is:
1. An acoustic-wave sensor comprising:
A base plate;
a membrane adapted to face the base plate and to be vibrated and displaced by an acoustic wave; a waveguide for transmitting light therein;
an optical coupling part to which the light transmitted through said waveguide is adapted to be optically coupled;
wherein one element out of the waveguide and the optical coupling part is fixed to the membrane and the other is fixed to the base plate, so that displacement of the membrane changes a relative distance between the waveguide and the optical coupling part,
wherein an optical signal is output which corresponds to an optical coupling coefficient between said waveguide and said optical coupling part, said optical coupling coefficient being changed in accordance with the relative distance between said waveguide and said optical coupling part; and
further comprising an annular support member connected between the base plate and the membrane.

2. An acoustic-wave sensor according to claim 1, wherein said optical coupling part is an optical resonator.

3. An acoustic-wave sensor according to claim 1, wherein said membrane and said optical coupling part are connected with each other, and said optical coupling part is displaced by a displacement of said membrane generated by its reception of the acoustic wave.

4. An acoustic-wave sensor according to claim 1, wherein said membrane and said waveguide are connected with each other, and said waveguide is displaced by a displacement of said membrane generated by its reception of the acoustic wave.

5. An acoustic-wave sensor according to claim 1, wherein said membrane is connected with either member of said waveguide and said optical coupling part, and only the member connected with said membrane among said waveguide and said optical coupling part is displaced by a displacement of said membrane generated by its reception of the acoustic wave.

6. An acoustic-wave sensor according to claim 5, wherein said optical coupling coefficient is a ratio of a part of light being coupled to said optical coupling part with respect to the light transmitted in said waveguide.

7. An acoustic-wave sensor according to claim 6, wherein said optical coupling coefficient is highest when said membrane receives no acoustic wave.

8. An acoustic-wave sensor according to claim 1, wherein the one element is fixed to the membrane at a position different from a node for a vibration mode of the membrane.

9. An acoustic-wave sensor according to claim 1, wherein a first resonant frequency of the one element is larger than a second resonant frequency of the membrane.

10. An acoustic-wave sensor according to claim 1, wherein an initial relative distance between the waveguide and the optical coupling part is set so as to satisfy a critical coupling condition.

11. An acoustic-wave sensor comprising:
a base plate;
a membrane adapted to face the base plate and to be vibrated and displaced by an acoustic wave;
a first waveguide for transmitting light therein;
an optical coupling part to which the light transmitted through said first waveguide is adapted to be optically coupled;
a second waveguide in which the light coupled from said optical coupling part transmits,
wherein the optical coupling part is fixed to the membrane and the first and second waveguides are fixed to the base plate, so that displacement of the membrane changes a relative distance between the optical coupling part and the first and second waveguides, wherein an optical signal is output which corresponds to at least one of a first optical coupling coefficient between said first waveguide and said optical coupling part and a second optical coupling coefficient between said second waveguide and said optical coupling part, wherein said first optical coupling coefficient is changed in accordance with the relative distance between said optical coupling part and said first waveguide, and wherein said second optical coupling coefficient is changed in accordance with the relative distance between said second waveguide and said optical coupling part, and further comprising an annular support member connected between the base plate and the membrane.

12. An acoustic-wave sensor according to claim 11, wherein said membrane is connected with either member of said first and second waveguides and said optical coupling part, and only the member connected with said membrane among said first and second waveguides and said optical coupling part is displaced by a displacement of said membrane generated by its reception of the acoustic wave.

13. An acoustic-wave sensor according to claim 11, wherein said first optical coupling coefficient and said second optical coupling coefficient are highest when said membrane receives no acoustic wave.

14. An acoustic-wave sensor according to claim 11, wherein the one element is fixed to the membrane at a position different from a node for a vibration mode of the membrane.

15. An acoustic-wave sensor according to claim 11, wherein a first resonant frequency of the one element is larger than a second resonant frequency of the membrane.

16. An acoustic-wave sensor according to claim 11, wherein an initial relative distance between the waveguide and the optical coupling part is set so as to satisfy a critical coupling condition.

17. An acoustic-wave sensor comprising:
a base plate;
a membrane adapted to face the base plate and to be vibrated and displaced by an acoustic wave; a first waveguide for transmitting light therein;
a second waveguide in which the light coupled from said first waveguide transmits, wherein one waveguide out of the first waveguide and the second waveguide is fixed to the membrane and the other is fixed to the base plate, so that displacement of the membrane changes a relative distance between the first waveguide and the second waveguide, wherein an optical signal is output which corresponds to an optical coupling coefficient between said first waveguide and said second waveguide, and wherein said optical coupling coefficient is changed in accordance with the relative distance between said second waveguide and said first waveguide; and further comprising an annular support member connected between the base plate and the membrane.

18. An acoustic-wave sensor according to claim 17, wherein said membrane is connected with either member of said first waveguide and said second waveguides, and only the member connected with said membrane among said first waveguide and said second waveguides is displaced by a displacement of said membrane generated by its reception of the acoustic wave.

19. An acoustic-wave sensor according to claim 17, wherein said optical coupling coefficient is highest when said membrane receives no acoustic wave.

20. An acoustic-wave sensor according to claim 17, wherein the one element is fixed to the membrane at a position different from a node for a vibration mode of the membrane.

21. An acoustic-wave sensor according to claim 17, wherein a first resonant frequency of the one element is larger than a second resonant frequency of the membrane.

22. An acoustic-wave sensor according to claim 17, wherein an initial relative distance between the waveguide and the optical coupling part is set so as to satisfy a critical coupling condition.

23. An acoustic-wave sensor array comprising a plurality of acoustic-wave sensors, each of which is the acoustic-wave sensor according to claim 1.

24. An ultrasonic imaging apparatus comprising:
an ultrasonic wave transmitting unit that receives a signal for transmitting an ultrasonic wave and generates an ultrasonic wave;
an ultrasonic probe composed of the acoustic-wave sensor array according to claim 23; and
an image processing unit that converts the ultrasonic wave received by said acoustic-wave sensor array into an image.

* * * * *